US012694145B2

(12) United States Patent
Oztunc et al.

(10) Patent No.: US 12,694,145 B2
(45) Date of Patent: Jul. 28, 2026

(54) MODULAR CYBERSECURITY ENGINE IN A DATA INTELLIGENCE SYSTEM

(71) Applicant: Microsoft Technology Licensing, LLC, Redmond, WA (US)

(72) Inventors: Derya Oztunc, Seattle, WA (US); Nitin Kumar Goel, Seattle, WA (US); Logan Sinclair Gabriel, Duvall, WA (US); Joseph Harris Linn, San Diego, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

(21) Appl. No.: 18/810,254

(22) Filed: Aug. 20, 2024

(65) Prior Publication Data

US 2026/0057089 A1 Feb. 26, 2026

(51) Int. Cl.
*H04L 29/06* (2006.01)
*G06F 21/62* (2013.01)

(52) U.S. Cl.
CPC .............................. *G06F 21/6218* (2013.01)

(58) Field of Classification Search
CPC .......................... G06F 21/6218; G06F 21/31
See application file for complete search history.

(56) References Cited

U.S. PATENT DOCUMENTS

| | | | |
|---|---|---|---|
| 2017/0359388 A1* | 12/2017 | Finchelstein ....... | G06F 16/1873 |
| 2024/0143789 A1* | 5/2024 | Brenner .............. | G06F 21/602 |
| 2024/0193282 A1* | 6/2024 | Townsend ........... | G06F 11/1464 |
| 2025/0021490 A1* | 1/2025 | Jaquette ............. | G06F 12/1408 |

* cited by examiner

*Primary Examiner* — Wasika Nipa
(74) *Attorney, Agent, or Firm* — Shook, Hardy & Bacon L.L.P.

(57) ABSTRACT

Methods, systems, and computer storage media for providing a modular cybersecurity platform are described. The modular cybersecurity platform is implemented using a modular cybersecurity engine that operates based on an analytical framework for dynamic data analysis and data management in a data intelligence system. In particular, the analytical framework is based on complementary modular components that are designed to interoperate in the modular cybersecurity engine. The modular cybersecurity engine includes a modular distributed system, a credential detection system, and a credential semantic graph system. The modular cybersecurity engine supports cybersecurity and sensitive data management scenarios that can empower investigators in various investigations, and provide automated flows that are highly scalable and support different types of functionality (e.g., priority embedding pipeline, credential scanning, and credential semantic graph analysis). The utility of the modular cybersecurity engine is demonstrated by its wide-ranging application in addressing complex cybersecurity challenges and sensitive data management tasks.

10 Claims, 13 Drawing Sheets

DATA INTELLIGENCE SYSTEM
100A

MODULAR CYBERSECURITY ENGINE
110

MODULAR CYBERSECURITY RESOURCES
112

DATASET
114

TOOLS
120

SEARCH ENGINE
120A

PROMPTING ENGINE
120B

CREDENTIAL SCANNER
120C

ADMIN ENGINE
120D

MODULAR DISTRIBUTED ENGINE
130

INTEGRATION ENGINE
130A

PERMISSIONS ENGINE
130B

AUDIT TRAIL ENGINE
130C

PRIORITY EMBEDDER
130D

CREDENTIAL DETECTION ENGINE
140

EMBEDDING VECTORS
140A

LIVE INTEGRATION
140D

SINGLE MODEL
140B

SEMANTIC MODEL
140C

CREDENTIAL SEMANTIC GRAPH ENGINE
150

MACHINE LEARNING ENGINE
150A

CREDENTIAL SIGNATURES
150B

CREDENTIAL SEMANTIC GRAPH
150C

EMBEDDING VECTORS
150D

DATA INTELLIGENCE CLIENT
170

DATA INTELLIGENCE-SUPPORTED COMPUTING ENVIRONMENT
180

402 — IDENTIFY SENSITIVE INFORMATION ASSOCIATED BASED ON A SINGLE MODEL AND A SEMANTIC MODEL

404 — GENERATE A NEW SEMANTIC QUERY BASED ON A SENSITIVE INFORMATION SIGNATURE ASSOCIATED WITH THE SENSITIVE INFORMATION

406 — UPDATE A SEMANTIC QUERY DATABASE WITH THE NEW SEMANTIC QUERY ASSOCIATED WITH THE SENSITIVE INFORMATION SIGNATURE

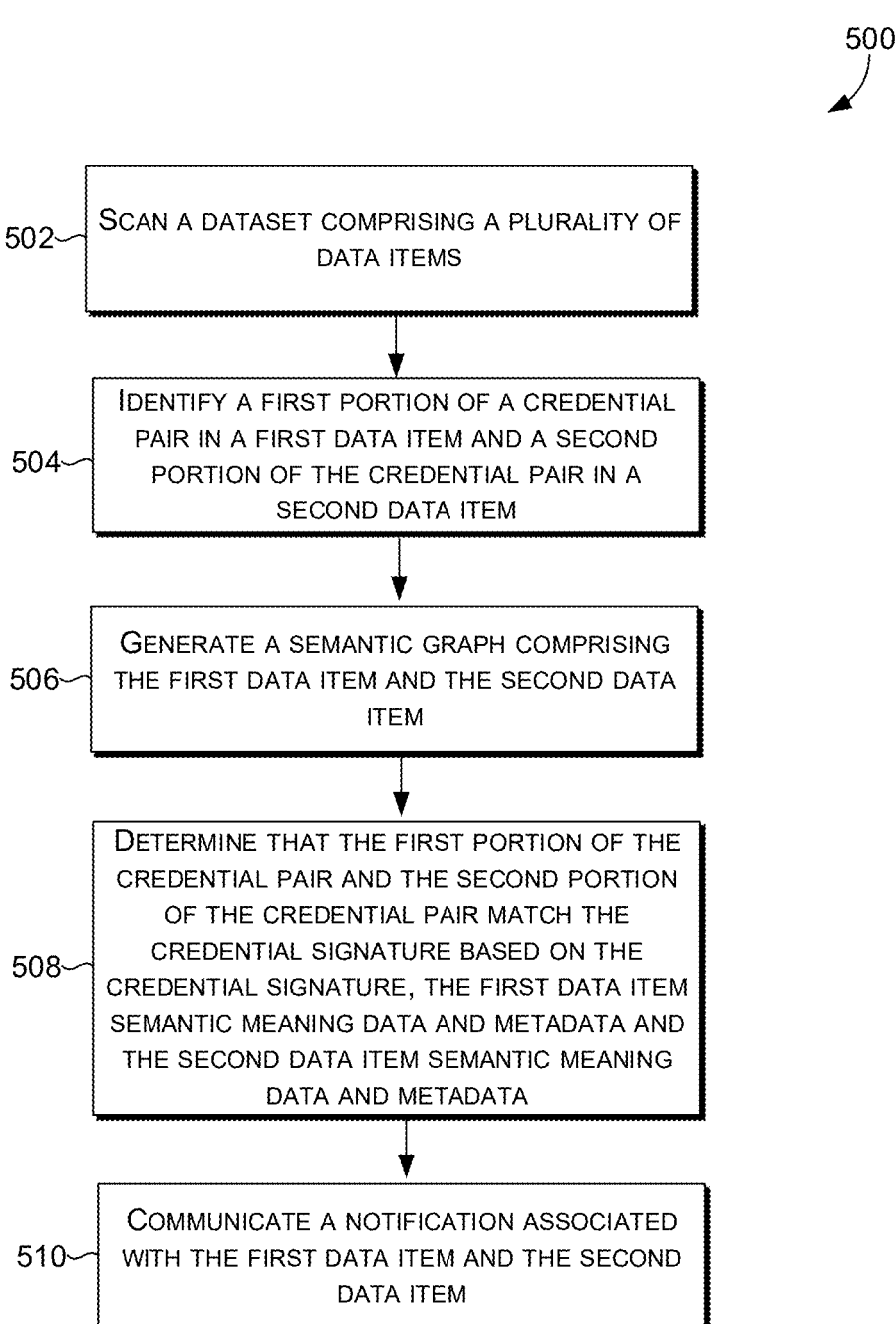

500

502 — SCAN A DATASET COMPRISING A PLURALITY OF DATA ITEMS

504 — IDENTIFY A FIRST PORTION OF A CREDENTIAL PAIR IN A FIRST DATA ITEM AND A SECOND PORTION OF THE CREDENTIAL PAIR IN A SECOND DATA ITEM

506 — GENERATE A SEMANTIC GRAPH COMPRISING THE FIRST DATA ITEM AND THE SECOND DATA ITEM

508 — DETERMINE THAT THE FIRST PORTION OF THE CREDENTIAL PAIR AND THE SECOND PORTION OF THE CREDENTIAL PAIR MATCH THE CREDENTIAL SIGNATURE BASED ON THE CREDENTIAL SIGNATURE, THE FIRST DATA ITEM SEMANTIC MEANING DATA AND METADATA AND THE SECOND DATA ITEM SEMANTIC MEANING DATA AND METADATA

510 — COMMUNICATE A NOTIFICATION ASSOCIATED WITH THE FIRST DATA ITEM AND THE SECOND DATA ITEM

CLIENT DEVICE
780

FABRIC
CONTROLLER
740

HOST
750

VIRTUAL
MACHINE
752

VIRTUAL
MACHINE
754

NODE 730

RESOURCES
760

RACK 720

CLOUD COMPUTING PLATFORM 710

MODULAR CYBERSECURITY ENGINE IN A DATA INTELLIGENCE SYSTEM

BACKGROUND

Users rely on computing systems to analyze vast amounts of data, derive insights, and make informed decisions. A data intelligence system refers to sophisticated platform design to collect, process, analyze, and present data to help user make informed decisions. In particular, the data intelligence system may integrate various data sources, employ advanced analytics, and provide actionable insights through intuitive visualizations and report tools. For example, a data intelligence system can support visualizing trends, patterns, and anomalies. The data intelligence can enable real-time monitoring, predictive analytics and comprehensive reporting, enhancing strategic planning and operational efficiency across a wide range of domains from cybersecurity to healthcare.

SUMMARY

Various aspects of the technology described herein are generally directed to systems, methods, and computer storage media for, among other things, providing a modular cybersecurity platform. The modular cybersecurity platform is implemented using a modular cybersecurity engine in a data intelligence system. The modular cybersecurity engine operates based on an analytical framework for dynamic data analysis and data management. In particular, the analytical framework is based on complementary modular components that are designed to interoperate in the modular cybersecurity engine. The modular cybersecurity engine includes a modular distributed system, a credential detection system, and a credential semantic graph system. The modular cybersecurity engine supports cybersecurity and sensitive data management scenarios that can empower investigators in various investigations, and provide automated flows that are highly scalable and support different types of functionality (e.g., customized permissions, credential scanning, and credential semantic graph analysis).

Conventionally, data intelligence systems are not configured with comprehensive logic and infrastructure to provide an adequate and efficient modular cybersecurity. Data intelligence systems operate based on vast amounts of datasets that include human-readable content that is both structured and semi-structured, making it too large for a machine learning models (e.g., large language models (LLM) to process the datasets in their entirety. Cybersecurity requires diverse tools to manage large volumes of data effectively. Without a modular cybersecurity system that integrates various tools, there exists a risk of insufficient flexibility to address diverse threats and challenges in adapting to new technologies or evolving threats, including limitations in traditional credential scanning methods relying on regex patterns.

By way of illustration, analyzing data in cybersecurity scenarios (e.g., from a breach) involves handling large amounts of data with different types of tools. Without a modular cybersecurity system that offers various types of cybersecurity tools, a conventional cybersecurity system can have limited flexibility in addressing diverse cyber threats, potential gaps in security coverage due to reliance on a single tool or approach, difficulty in integrating new technologies or adapting to evolving threats. Moreover, the lack of a modular cybersecurity system can lead to increased complexity and inefficiency in managing multiple disparate tools, reduced agility in responding to emerging cybersecurity challenges, and ultimately heightening the risk of successful cyber threats.

With reference specifically to credential scanning tools and systems, traditional credential and secret scanning methods, which rely on regex patterns, are insufficient due to their inflexibility and the manual effort required to update them. These credential scanning tools and systems have limited detection capabilities because they operate based on a limited array of credential representations. For instance, they might excel at detecting simple password formats but struggle with complex credentials like API keys or multifactor authentication tokens. This limitation stems from their narrow focus on predefined patterns, leading to missed detections and security gaps in environments.

A technical solution—to the limitations of conventional data intelligence systems—can include providing modular cybersecurity resources via a modular cybersecurity engine that operates based on an analytical framework for dynamic data analysis and management. The analytical framework combines three complementary technology innovations (i.e., modular distributed engine, credential detection engine, and credential semantic graph engine) in a modular security engine to address specific aspects of cybersecurity and data management.

The modular distributed engine provides a modular cybersecurity toolset that offers a customizable, secure, and efficient solution for cybersecurity analysis (e.g., breach analysis). The modular distributed engine provides dynamic access control, tailored tool availability, and the integration of a priority embedder pipeline that enables a nuanced approach to security and risk management in the face of complex cybersecurity incidents including data breaches.

The credential detection engine provides a resource-efficient, self-improving credential detection via sentence embeddings. The credential detection engine is associated with a machine learning model, where the machine learning model is designed to extract embedding vectors from sentences confirmed to contain valid credentials or secrets and utilize these embeddings to preemptively flag future content for in-depth analysis. The machine learning model learns and adapts, creating a semantic risk scoring model that evolves autonomously. As the machine learning model encounters new kinds of secrets and novel secret representations, the machine learning model adjusts without needing human intervention.

The credential semantic graph engine provides a comprehensive machine learning system for credential leak detection and semantic assembly. The credential semantic graph engine includes machine learning-based model that extracts embedding vectors from sentences confirmed to contain valid credentials. These embeddings encapsulate the semantic context of how secrets are typically presented in text. Moving forward, every new piece of content is checked against this expanding database of secret-containing sentence embeddings. The credential semantic graph engine performs semantic graph analysis to link related data fragments, such as parts of conversations, threads, or semantically similar content, to form a complete picture of sensitive information. This graph-based approach is particularly adept at identifying and reconstructing partial credentials that are not immediately apparent when examining individual data pieces. In this way, the credential semantic graph engine enhances the detection and assembly of secret credentials based on semantic contextual analysis, data fragment linking, and autonomous learning.

In operation, in a first embodiment, a dataset comprising a plurality of data items is accessed. The plurality of data items comprises a first data item and a second data item. A first set of content instances in the first data item are assigned corresponding priority values. A first set of unique content instances are identified in the first data item based on de-duplicating the first set of content instances based on their corresponding priority values and content instances. A second set of content instances in the second data item are assigned corresponding priority values. A second set of unique content instances are identified based on de-duplicating the second set of content instances based on their corresponding priority values and content instances. A third set of unique content instances in the first data item and the second data item are identified based on de-duplicating the first set of unique content instances and the second set of unique content instances based on their corresponding priority values and unique content instances. Embeddings for the third set of unique content instances are generated.

In a second embodiment, sensitive information is identified based on a single model or a semantic model. The single model is a first model that is trained to identify sensitive information from a dataset comprising a plurality of data items. The semantic model is a second model that trained to identify sensitive information based on interlinking data items. A new semantic query is generated based on a sensitive information signature associated with the sensitive information. A semantic query database is updated with the new semantic query associated with the sensitive information signature.

In a third embodiment, a dataset comprising a plurality of data items is scanned. Based on scanning the dataset, a first portion of a credential pair is identified in a first data item and a second portion of the credential data pair is identified in a second data item. A semantic graph is generated. The semantic graph comprising the first data item and the second data item. The first data item is associated with first data item semantic meaning and first data item metadata and the second data item is associated with second data item semantic meaning and second data item metadata. Based on a credential signature, the first data item semantic meaning, the first data item metadata, the second data item semantic meaning, and the second data item metadata, a determination is made that the first portion of the credential pair and the second portion of the credential pair match the credential signature. Based on determining that the first portion of the credential pair and the second portion of the credential pair match the credential signature, a notification associated with the first data item and the second data item are communicated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein:

FIGS. 1A-1E are block diagrams of an exemplary data intelligence system including a modular cybersecurity engine, in accordance with aspects of the technology described herein;

FIG. 5 provides a third exemplary method of providing credential detection using a modular cybersecurity engine, in accordance with aspects of the technology described herein;

DETAILED DESCRIPTION

Overview

Figure 1B:
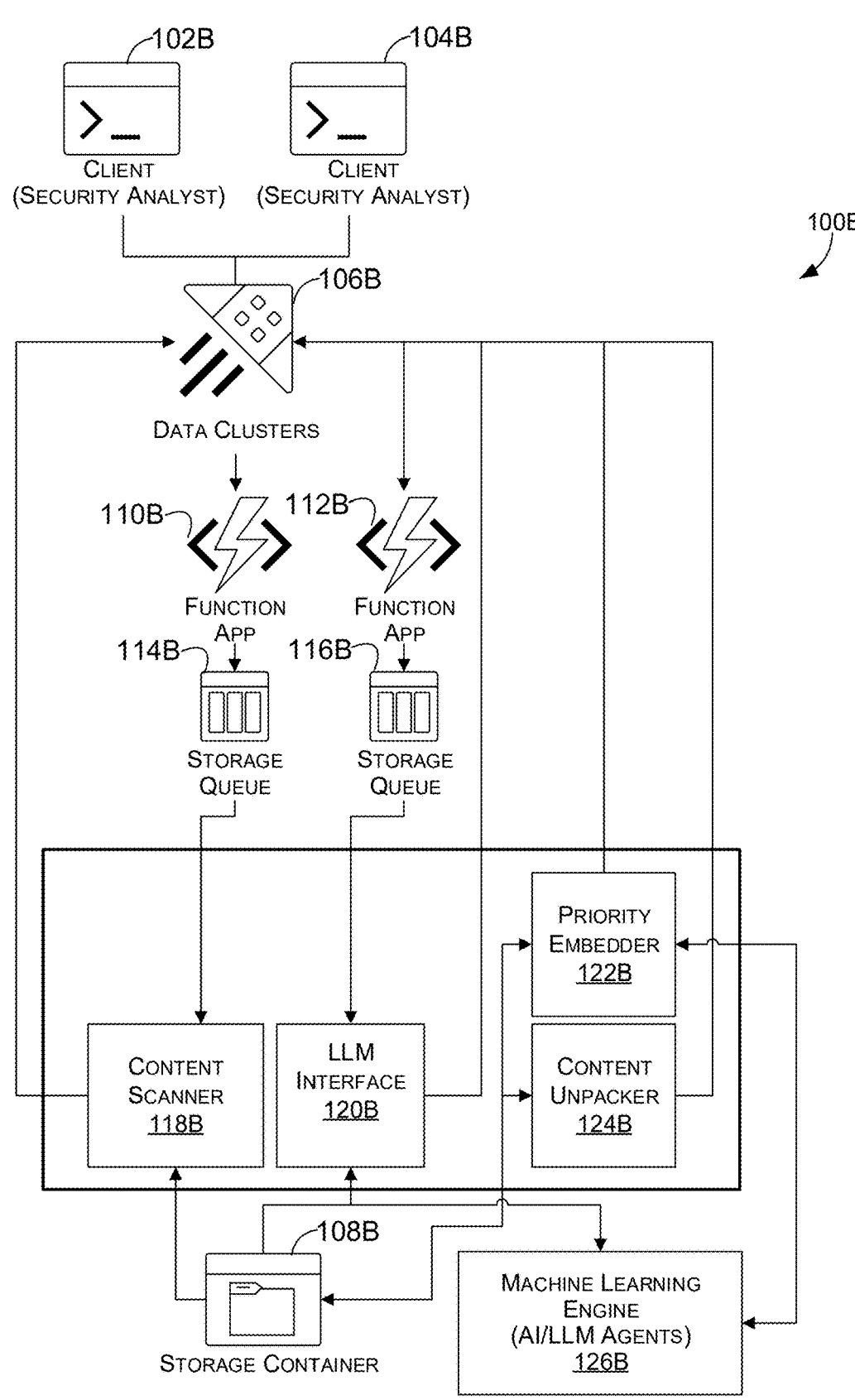

A data intelligence system provides a platform or framework designed to collect, process, analyze, and interpret large volumes of data from various sources to derive actionable insights and support decision-making processes. Data intelligence systems often utilize advanced technologies such as artificial intelligence, machine learning, natural language processing, and data visualization techniques to uncover patterns, trends, correlations, and anomalies within the data. By way of illustration, in cybersecurity, a data intelligence system monitors and analyzes network traffic, system logs, and other data sources to detect and respond to security threats. It uses advanced algorithms to identify suspicious activities, such as unauthorized access attempts or malware infections, and provides real-time alerts to security teams. By correlating data from multiple sources, it can uncover complex attack patterns and help organizations strengthen their defenses.

Conventionally, data intelligence systems are not configured with comprehensive logic and infrastructure to provide an adequate and efficient data analysis pipeline. Data intelligence systems process vast amounts of datasets that include human-readable content that is both structured and semi-structured, making it too large for machine learning models (e.g., large language models—LLM) to process the datasets in their entirety. Analyzing data in cybersecurity scenarios, such as during or after a breach, involves handling large amounts of data using a variety of tools. This process is crucial for identifying the source, extent, and impact of the breach. Effective data analysis in these situations requires a modular cybersecurity system that integrates various tools and technologies to provide comprehensive protection and rapid response capabilities. Several challenges are possible without a modular cybersecurity system. Relying on a single tool or approach can leave organizations vulnerable to different types of threats that the tool is not designed to handle. A lack of modularity makes it difficult to adapt to new and evolving threats, which can rapidly change in tactics, techniques, and procedures (TTPs). Moreover, there exists potential for gaps in security coverage. Using a single tool often results in security gaps, as it might not cover all threat vectors or detect all types of malicious activities. Some tools are specialized for certain threats and may not be effective against others, leading to incomplete security postures.

Without a modular cybersecurity system, integrating new cybersecurity technologies or upgrading existing ones can be challenging and resource-intensive. Ensuring compatibility between disparate tools can be difficult, often leading to integration issues and reduced overall effectiveness. Additionally, managing multiple disparate tools without a unified system increases complexity and administrative overhead. Lack of integration can lead to inefficiencies in security operations, as data and alerts from different tools need to be manually correlated. A non-modular system can slow down the response to new threats, as security teams must manually adjust and reconfigure tools. As threats scale in complexity and volume, a rigid system may not scale effectively to meet these new challenges. The combined effect of the above issues increases the risk of successful cyberattacks, as vulnerabilities are more likely to be missed and response times are slower.

Specifically focusing on credential scanning tools and systems, traditional methods often rely on regular expressions (regex) patterns to identify credentials and secrets within codebases. However, these methods are becoming increasingly insufficient for several reasons: Regex patterns are static and must be manually updated to recognize new patterns of credentials and secrets, which is labor-intensive and error-prone. In modern, dynamic development environments, static regex patterns struggle to keep up with the variety and evolution of credential representations. Regularly updating regex patterns to account for new types of credentials is a manual process that requires significant effort and expertise. The manual nature of this process increases the risk of human error, leading to potential gaps in detection. Regex-based tools are limited to detecting only those patterns they are explicitly programmed to recognize, missing credentials that do not fit predefined patterns. As credential and secret formats diversify, regex patterns may fail to detect many legitimate credentials, leading to security blind spots. As such, a more comprehensive cybersecurity system—with an alternative basis for performing cybersecurity operations—can improve computing operations and interfaces in data intelligence systems.

Description of Technical Solution

At a high level, in today's digital ecosystem, organizations face a myriad of complex and evolving cybersecurity threats that jeopardize sensitive data, intellectual property, and compliance with privacy regulations. A robust, flexible, and scalable solution can be provided, not only to respond to current security challenges, but also to anticipate and adapt to future threats. The modular cybersecurity engine provides a comprehensive solution that addresses these limitations by integrating advanced technologies and methodologies to create a versatile system for cybersecurity risk management and sensitive data protection. In particular, the modular cybersecurity engine supports an adaptive analytical framework for dynamic cybersecurity and sensitive data management. Dynamic cybersecurity involves proactive measures and adaptive measures taken to protect sensitive data from evolving threats in real-time. It encompasses continuous monitoring, threat detection, and response strategies to swiftly address potential vulnerabilities and attacks. Effective sensitive data management within this framework ensures that information is securely stored, accessed, and transmitted while maintaining compliance with relevant regulations and minimizing risks of unauthorized access or data breaches.

The modular cybersecurity engine includes three complementary technological solutions each addressing aspects of cybersecurity and data management. First, a modular distributed system with a comprehensive toolset "modular distributed engine". At its core, this system offers a modular and customizable platform that equips users—via the modular cybersecurity engine—with a diverse array of analytical tools. These tools can be configured and combined based on a user's role, access level, and specific security requirements. The modular distributed engine's design ensures a balance between comprehensive risk analysis and stringent control over sensitive data. Tools available for use include but are not limited to: credential scanners, keyword-based text search, embedding-based semantic search, LLM prompting, and more. Modular distributed engine includes priority embedder pipeline that provides semantic indexing of a dataset. The priority embedding pipeline employs a sharding technique for deduplication and real-time prioritization of data, ensuring that critical information is processed with urgency and efficiency.

Second, a resource-efficient, self-improving credential detection system ("credential detection engine"). Using sentence embeddings and machine learning, this component of the framework enhances the detection of sensitive credentials within an organization's digital content. Credential detection engine serves as an intelligent pre-filter, identifying potential secrets based on semantic similarity to known secret-containing sentences, and triggering a more detailed analysis with LLMs for high-risk content. This credential detection engine is designed to learn and adapt, incorporating new secret patterns and representations into its model autonomously, ensuring continuous improvement in detection capabilities.

Third, a comprehensive machine learning system for credential leak detection and semantic assembly "credential semantic graph engine". This credential semantic graph engine extends the capabilities of the framework by employing semantic graph analysis in conjunction with sentence embeddings. The credential semantic graph engine is adept at identifying and linking fragmented pieces of sensitive information that may be scattered across various data points, reconstructing partial credentials, and providing a holistic view of potential data leaks.

The integration of the modular distributed engine, the credential detection engine, and the credential semantic graph engine results in a unified framework that not only excels at credential scanning but is also designed to be broadened for other applications such as privacy policy violations, sensitive data analysis, and more. This adaptability ensures that the framework remains relevant and effective in the face of new and unforeseen cybersecurity challenges. In this way, the modular cybersecurity engine provides an adaptable framework that can be fine-tuned for various cybersecurity and data management applications. The modular cybersecurity engine's flexible design allows for the evolution of its capabilities to meet emerging needs.

The utility of the modular cybersecurity engine is demonstrated by its wide-ranging application in addressing complex cybersecurity challenges and sensitive data management tasks. Existing systems rely on rigid rules constructed ahead of time, in contrast to the modular cybersecurity engine that determines and continually self-improves its own semantically flexible detection rules. The modular cybersecurity engine provides a versatile and integrated solution for managing a broad spectrum of cyber risks and data protection needs. By providing a framework that can be adapted for different applications, the modular cybersecurity engine ensures long-term relevance and utility in the dynamic field of cybersecurity and data management. In this way, the modular cybersecurity engine offers a robust and scalable security solution designed for large-scale investigations, featuring comprehensive capabilities and granular access controls. Moreover, the novel application of language models provides enhanced precision and efficiency, making comprehensive security investigations feasible on a previously unprecedented scale.

Example Systems and Resources

Aspects of the technical solution can be described by way of examples and with reference to FIGS. 1A-1E, 2A and 2B. FIG. 1A illustrates a cloud computing environment (system) 100, data intelligence system 100A, modular cybersecurity engine 110, modular cybersecurity resources 112, dataset 112, tools 120, modular distributed engine 130, credential detecting engine 140, and credential semantic graph engine 150, data intelligence client 170, and data intelligence-supported computing environment.

Cloud computing system 100 includes data intelligence system 100A that provides an operating environment for modular cybersecurity engine 100 that operates with data intelligence client 170 and data intelligence-supported computing environment 180. The modular cybersecurity engine 100 operates in conjunction with a data intelligence client 170, facilitating the provisioning of modular cybersecurity processing functionality that can be tailored data intelligence-supported computing environment 180. For example, through user interactions via the data intelligence client 170, the data intelligence client 170 leverages the modular cybersecurity capabilities to generate explainable analysis of large volumes of data (e.g., dataset 120) associated with data intelligence-supported computing environment 180.

With reference to FIG. 1B, FIG. 1B illustrates an example cloud computing system 100B with various components that interact to provide modular cybersecurity services. Client 102B and client 104B can be security analyst workstations that operates as user's entry point into the modular cybersecurity computing environment. Client 102B and client 104B connect to the cloud environment via secure protocols (e.g., VPN, SSL/TLS) to access data, tools, and services hosted in the cloud. A user can use a client to query, interact, monitor, and analyze datasets associated with modular cybersecurity services.

Data clusters 106B are collections of servers that store and process large volumes of data. Data clusters 106B provide the computational power needed for modular cybersecurity services. Data clusters 106B pull data from storage containers (e.g., storage containers 108B) and process it. Function apps (e.g., function app 110B and function app 112B) are serverless computing services that run discrete pieces of code in response to specific events or triggers. They handle tasks such as data transformation, processing, and automation. Function apps are connected to storage queues. They trigger based on new messages in the queues, perform necessary computations or transformations, and then pass data to other tools or storage.

Storage queues (e.g., storage queues 114B and storage queues 116) are used to manage and store messages or tasks that need to be processed by function apps. They ensure reliable communication and task handling. Data or tasks generated by various sources (e.g., data clusters, tools) are placed in storage queues. Function apps monitor these queues and process the messages as they arrive.

Modular cybersecurity services include tools (e.g., content scanner 118B, LLM interface 120B, priority embedder 122B, and content unpacker 124B). These tools represent specialized applications or services used for security analysis, data processing, or other specific tasks. For example, the content scanner accesses data from function apps, processes it, and may store results in the storage container 108B or pass it to LLM interface 120B. The LLM interface 120B processes the data received from the content scanner or directly from function apps. LLM interface 120B can interact with other components like data clusters for additional analysis or storage.

The storage container 108B is used to store raw and processed data. It provides persistent, scalable storage for large datasets. Data clusters 106B read from and write to the storage container 108B. Function apps and tools use the storage container 108B to store intermediate and final results. The machine learning engine accesses stored data for training and inference.

Machine learning engine 126B (including AI and LLM agents) is responsible for training models, running inference, and providing AI-driven insights. The LLM (Large Language Model) agent is a specialized component for natural language processing tasks. The machine learning engine 126 consumes data from the storage container for model training and inference. Results from the machine learning engine 126B can be fed back into data clusters, tools, or directly to the client (security analyst workstation) for actionable insights. The LLM agent can provide advanced analytics, generate reports, or assist in automated responses based on the data it processes. By integrating these components into a cohesive cloud computing environment, organizations can achieve high levels of data processing, security analysis, and operational efficiency, all while maintaining scalability and flexibility to adapt to changing needs and threats.

Turning to FIG. 1A, FIG. 1A includes modular cybersecurity resources 112 that include operations, interfaces, and data that support providing data analysis functionality. The operations include tools integrations, adaptive access, security, and resource management, auditing, priority embedding, searching, semantic graph building, and credential scanning. Interfaces involve graphical user interfaces (GUIs) for user-friendly interaction, visualizations for pattern and trend analysis, command-line interfaces (CLIs) for automation and advanced features, APIs for integrating with other systems, and web services for remote access. The data includes raw datasets, intermediate processed data, semantic graphs data, analysis results, clustered-data outputs, and final insights for reporting and decision-making. Modular cybersecurity resources 112 enable an adaptive analytical approach that serves as a unified technical solution for a variety of cybersecurity and data management needs.

Dataset 114 refers to structured collection of individual units of information (e.g., data items) each representing a specific entity, event, or observation within a defined context. A data item refers to a discrete unit of information or record that is individually identifiable and stored as part of a larger collection. This could include various types of digital content such as documents, emails, images, videos, database entries, or even structured data points like sensor readings or transaction records. Each data item typically contains specific attributes, properties, or metadata that describe its content, context, and relevance within the dataset.

A dataset 114 of breached data can refer to a collection of compromised information typically obtained from security incidents or breaches. This dataset 114 can include email addresses that have been exposed to unauthorized access or disclosure, often alongside other personal or sensitive information. Analysts scrutinize this dataset 114 to identify patterns of unauthorized access, potential vulnerabilities, or indicators of compromised accounts. Sensitive information refers to data that, if exposed or compromised, could result in harm to individuals or organizations. Specifically, in the context of breached data, sensitive information includes personally identifiable information (PII) such as full names, addresses, social security numbers, and financial data like credit card numbers or bank account details. In incidents involving search for credentials, sensitive information extends to login credentials such as usernames, passwords, or access tokens, which, if accessed by unauthorized parties, can lead to identity theft, unauthorized access to systems, or financial fraud.

A data item can include a content instance, the content instance refers to a discrete unit of information or data within a larger set, often representing a singular entity, event, or piece of content. Specifically, in the context of documents or emails, a content instance can denote individual sentences or paragraphs that convey specific meanings or details. These content instances are typically analyzed, processed, or retrieved based on their semantic content, serving as the fundamental units for tasks like information extraction, summarization, or sentiment analysis in natural language processing (NLP) applications. For example, a content instance for generating a semantic index can be assigned a priority value.

A priority value refers to a quantified measure of an importance or relevance a context instance within a given context. The priority value can be a score that is derived from various contextual data (e.g., as file type, location within the document, or other relevant attributes) associated with the content instance. Contextual data refers to additional information or metadata that provides relevant context, circumstances, or conditions surrounding a specific piece of primary data. Contextual data includes contextual attributes, enabling deeper understanding and interpretation. Contextual data can not only the raw information itself but also metadata, timestamps, relationships, and other contextual cues that provide additional layers of meaning and relevance. The priority value generated based on the contextual data enables prioritization of content instances for further processing or retrieval.

A data item can be associated with a unique content instance. A unique content instance refers to a specific, individual occurrence of information within a dataset or digital context that stands distinct from others in terms of its content and context. Unique content instance represents a singular unit of data that is identifiable and separate from any identical or similar instances within the dataset. For example, within an email dataset, a unique content instance could be a particular sentence or paragraph that uniquely captures a specific piece of information or contextually relevant detail, serving as a discrete entity for analysis, retrieval, or categorization purposes.

For example, a content instance within an email can take different forms of uniqueness. Consider an email where a customer expresses a product issue: In the email, the sentence "I recently purchased your product and am experiencing difficulties with its functionality." may appear more than once due to the customer's detailed explanation. Within this single email, a selected unique instance can be selected as a unique content instance, serving as the specific representation chosen for embedding or analysis within this particular communication. Across multiple emails from various customers, this same sentence might recur in different contexts and from different senders. In this broader dataset, a selected unique becomes a unique content instance when selected consistently for embedding or analysis purposes across multiple documents.

Embedding refers to a technique used in natural language processing (NLP) and machine learning to represent words, sentences, or documents as numerical vectors in a continuous, high-dimensional space. These embeddings capture semantic relationships and contextual meanings of words or texts, enabling algorithms to process and understand language more effectively. An embedding vector is a specific instance of an embedding, representing a word, sentence, or document as a vector of numerical values in an embedding space. Each dimension of the vector corresponds to a specific feature or aspect of the word or text's semantics. A sentence embedding refers to the process of representing an entire sentence or phrase as a single embedding vector. This embedding vector encapsulates the semantic meaning and context of the entire sentence in a compact form suitable for machine learning tasks such as classification, similarity analysis, or information retrieval. A sentence embedding can be a numerical representation of sentences extracted from breached datasets, specifically designed to encode semantic meanings and contextual nuances. Sentence embeddings enable efficient and accurate detection of sensitive information such as credentials, personal data, or proprietary information within breached datasets, facilitating proactive identification and mitigation of security risks.

Tools 120 include cybersecurity tools that perform specific tasks or functions and are integrated into the modular cybersecurity engine 110. These tools are typically developed to automate processes, facilitate complex operations, or enhance productivity within various domains, including cybersecurity, software development, data analysis, and project management. They may range from simple utilities to sophisticated platforms, tailored to meet specific needs such as monitoring, analysis, protection, or management of resources and information. Tools often incorporate user interfaces or APIs to interact with users and other systems, aiming to streamline workflows, improve decision-making, and achieve desired outcomes effectively.

Search engine 120A is designed to systematically search and retrieve information from large volumes of data, such as files, databases, or network logs. Search engine 120A allows users to query for specific data points, patterns, or anomalies within their modular security engine 110. Prompting engine 120B is a tool that actively encourages or alerts users to take specific actions based on predefined conditions or events. Prompting engine 120 operates by generating prompts or notifications to inform users about critical security incidents or operational tasks. Credential scanner 120C is designed to detect and assess vulnerabilities related to credentials within dataset 114. Credential scanner 120C scans for exposed or weak credentials, such as default passwords, reused passwords, or credentials stored insecurely. Admin engine 120D supports management and orchestration used by administrators to oversee and control various aspects of modular cybersecurity operations. Admin engine 120D provides centralized management capabilities for tasks such as user access control, configuration management, patch deployment, and incident response coordination. Admin engine 120D streamlines administrative workflows, ensure compliance with security policies, and facilitate efficient resource allocation, supporting overall modular cybersecurity governance.

Modular distributed engine 130 supports executing tasks across multiple tools in the modular cybersecurity engine. Modular distributed engine 130 can further provide functionality with distinct functions, allowing for scalable and efficient processing of tasks across distributed systems. Modular distributed engine 130 includes integration engine 130A that supports interoperability between different tools and provides a centralized hub for programmatic interactions, data transformation, routing, and orchestration, enabling smooth exchange of information and workflows between disparate systems that may use different protocols, data formats, or interfaces. A cybersecurity workflow refers to a structured sequence of tasks, actions, and processes designed to address specific security objectives within the modular cybersecurity engine 110. Cybersecurity workflows can typically be automated or semi-automated, leveraging various cybersecurity tools and technologies, where the workflows are tailored to handle different aspects of cybersecurity operations. For example, integration engine 130A facilitates the automation and coordination of various cybersecurity workflows across multiple modular tools. Modular distributed engine 130 operates by defining queries that initiate specific workflows tailored to handle diverse tasks. The integration of results involves consolidating findings from different security tools and systems, processing them through data normalization and correlation processes, and presenting unified insights to cybersecurity analysts or automated response mechanisms for further action.

Integration engine 130A can integrate a single query language to execute commands against different types of cybersecurity tools—providing a middleware layer that acts as a universal translator and executor. Integration engine 130A can operate based on a common query language syntax and semantics that can be understood by various cybersecurity tools. This language can encompass commands for querying, retrieving, and manipulating data from different types of tools. Integration engine 130 can also provide adapters or plugins for each cybersecurity tool that translate the standardized queries into the specific commands and APIs understood by that tool. These adapters act as intermediaries, converting queries from the unified query language into native commands. Integration engine 130A can support a query router or dispatcher within the integration component. When a query is submitted in the unified language, the router identifies the appropriate adapter based on the target cybersecurity tool and forwards the query for execution. Once queries are executed against individual tools, the integration engine 130A can aggregate the results returned from each tool, normalize the data format if necessary to ensure consistency across different outputs, facilitating unified presentation and analysis.

Integration engine 130A supports the integration of new and updated cybersecurity tools into their environment more seamlessly. As long as the new tool supports the standardized query language, it can be integrated without requiring extensive custom development or integration efforts. Scalability is also enhanced by reducing the dependency on specific tool interfaces or APIs. Modular cybersecurity engine 110 infrastructure can scale by adding new tools or upgrading existing ones without disrupting the query execution process.

Permissions engine 130B manages and enforces access rights and permissions within a system or application. Permissions engine 130B controls user or entity access to resources based on defined policies, roles, or attributes, ensuring security and compliance with modular cybersecurity engine 110 policies. Permissions engine 130B specifies access rights to various cybersecurity tools within the system. For example, some users may have permission to use specific analytical tools or execute certain commands. Permissions engine 130B regulates access to different datasets stored within the system. This includes read, write, modify, and delete permissions based on user roles and data sensitivity. Permissions engine 130B provides access to result datasets to ensure that users can access and interpret the outputs or findings generated by cybersecurity tools, subject to their authorized access level. Permissions engine 130B enforces proper security measures, such as authentication and authorization, to control access to the cybersecurity tools and data sources.

Audit trail engine 130C includes telemetry capabilities to track and audit user actions. Audit trail engine 130C implement monitoring capabilities to track query execution and performance across different tools and sets up error handling mechanisms to manage exceptions and failures gracefully, providing alerts or fallback options when necessary. For example, logging can be provided so that every action taken by users, such as accessing tools, datasets, or result datasets, is logged. This includes timestamped records of who accessed what data and when. Detailed audit trails provide visibility into permissions changes, access attempts, and any security-related incidents. This helps in monitoring user behavior and detecting unauthorized access or anomalies.

Priority embedder 130D supports a systematic process used to transform raw data into meaningful numerical representations, known as embeddings. Priority embedder 130C is associated with stages such as data preprocessing, where input data is cleaned and prepared, followed by the application of embedding models which generate embeddings based on specific algorithms or neural network architectures. The final stage often includes evaluation and integration of embeddings into downstream applications or analysis, ensuring that the transformed representations effectively capture relevant features of the original data.

By way of illustration, in an embedder pipeline focused on analyzing data items like emails or documents and prioritizing content instances for embedding generation, the process typically involves several key steps: Priority embedder 130D begins by parsing each data item (e.g., email, document) into its constituent parts, such as paragraphs, sentences, or sections. This step ensures that the content is segmented in a structured manner for subsequent analysis. Priority embedder 130D evaluates content instances (e.g., sentences) based on predefined criteria to determine its relevance or importance for embedding generation. Criteria may include factors such as keywords, sentiment analysis scores, or domain-specific rules. Based on the evaluation, segments are prioritized for embedding generation. Segments that meet the criteria for relevance or significance are selected to undergo the embedding process, ensuring that the resulting embeddings capture the most meaningful aspects of the dataset.

Credential detection engine 140 employs embedding vectors (e.g., sentence embeddings) and machine learning (e.g., single model 140B and semantic model 140C) to enhance the detection of sensitive credentials within an organization's digital content (e.g., dataset 114). Two separate models can be trained. Single model 140B refers to a highly focused model that is trained to predict secrets and other sensitive information from dataset 114 and semantic model 140C refers to a model that is trained to semantically bridge data and predict sensitive information from multiple pieces.

Single model 140B is a first model that is specifically engineered with advanced algorithms to effectively identify and predict confidential data, such as secrets and sensitive information, contained within Dataset 114. Single model 140B employs state-of-the-art techniques in natural language processing (NLP) and machine learning to achieve high accuracy in recognizing and categorizing data elements that require protection.

Complementing this, semantic model 140C is a second model that operates as a sophisticated semantic engine capable of integrating and extrapolating insights from multiple datasets. Semantic model 140C leverages embedding vectors 140A (e.g., semantic embeddings) and contextual understanding to bridge data across disparate sources, facilitating holistic analysis and predictive modeling.

A sensitive information signature is a programmatically generated representation (e.g., embedding vector) of a sentence confirmed to contain valid credentials or secrets, typically derived through natural language processing techniques. This signature serves as a unique identifier or fingerprint of sensitive information within textual content, enabling preemptive identification and flagging of similar instances for further analysis. By leveraging embeddings, the signature encapsulates semantic and contextual features of the sensitive content, facilitating automated detection and response to potential security threats or breaches in digital environments.

A semantic query is a query formulated to retrieve information based on the meaning or context of the data rather than relying solely on specific keywords or exact matches. A semantic query supports using semantic understanding and embeddings to search for data that is conceptually related to the query, enabling more nuanced and accurate retrieval of information that aligns with the user's intent or contextually relevant criteria. Semantic queries can be stored in a semantic query database. Semantic query database refers to a specialized repository or storage system designed to store and manage semantic queries used in information retrieval and natural language processing applications. Semantic query database maintains a collection of queries that are structured to capture the semantic meaning and context of user inquiries or search criteria rather than relying solely on keywords. A semantic query associated with a sensitive information signature is a sophisticated computational request used by a Language Model (LLM) to assess (i.e., language model reasoning) whether content instances within a dataset exhibit characteristics consistent with the identified sensitive information. Each sensitive information signature is derived from thorough analysis and validation of sentences containing credentials or confidential data, employing advanced natural language processing (NLP) techniques like semantic embedding models.

For example, suppose a sensitive information signature is generated for a sentence containing a password. The semantic query then employs this signature to scrutinize all sentences in a dataset, seeking matches that suggest similar sensitive content. The database housing these signatures acts as a repository that is regularly updated with fresh intelligence on emerging security risks and sensitive information patterns. Each new signature enhances the LLM's ability to identify and flag sensitive content accurately, reinforcing security measures and preemptively protecting against unauthorized access or data leaks.

Live integration 140C operates to test candidate credentials against a computing environment. For example, after the credential detection engine 140 systematically scans through large volumes of data to isolate instances that resemble credential pairs, such as usernames and passwords, candidate credentials are identified in data items. In particular, a credential pair refers to two portions of information associated with authentication and access control: the first portion, commonly a username or identifier (e.g., "john_doe" or "admin"), uniquely identifies a user or entity within a system. The second portion, a password or secret (e.g., "Password123!" or "Admin@2023"), remains confidential and serves as a secure means of verifying identity alongside the username. Credential pairs facilitate secure user authentication and protect sensitive information from unauthorized access or breaches. When a candidate credential successfully authenticates, it strongly indicates the legitimacy of the credential. This validation not only confirms the usability of the credential but also triggers the capture of comprehensive contextual data surrounding it, such as originating IP address, timestamp of authentication, and any associated metadata.

For example, consider a scenario where the system identifies a potential credential pair ("admin" as the username and "Password123!" as the password) within a dataset of breached credentials. Using APIs, live integration 140C tests these credentials against a simulated authentication endpoint. Upon successful authentication, the system records detailed metadata, including the exact source of the credential and the verification timestamp. This information is then utilized to construct a credential signature, which encapsulates semantic and contextual features of the authenticated credential pair. The resulting credential signature serves as a pivotal asset for subsequent dataset analysis and security operations. By leveraging embeddings and semantic understanding, it enables proactive monitoring and detection of similar credentials across datasets, bolstering defenses against unauthorized access attempts and reinforcing cybersecurity measures in digital environments.

Credential semantic graph engine 150 provides leak detection and semantic assembly and employs a credential semantic graph 150C analysis in conjunction with embedding vectors 150D (e.g., sentence embeddings). The credential semantic graph engine 150 is adept at identifying and linking fragmented pieces of sensitive information that may be scattered across various data points, reconstructing partial credentials, and providing a holistic view of potential data leaks.

Credential signatures 150B includes a plurality of credential signatures where a credential signature refers to a pattern or format used to identify and validate credentials such as passwords, usernames, or API keys within text or data streams. Regex patterns define rules for the structure, composition, and allowable characters of credentials, enabling automated detection, extraction, and validation of these sensitive pieces of information from larger datasets or text inputs. A credential signature can be a specialized type of sensitive information signature that serves as a computationally generated representation (e.g., embedding) of a sentence confirmed to contain valid credentials or secrets, extracted using advanced natural language processing techniques. This sensitive information signature acts as a distinctive identifier or fingerprint within textual content, enabling proactive identification and flagging of instances where sensitive credential information, such as usernames and passwords, may be present. By capturing semantic and contextual attributes of the sensitive content through embeddings, credential signatures facilitate automated detection and response mechanisms, bolstering cybersecurity efforts by preemptively addressing potential security threats or data breaches in digital environments.

A credential semantic graph 150C (e.g., a semantic graph) refers to data structure that represents relationships between entities using contextual data (e.g., semantic meaning and metadata). Contextual data refers to information that has been enriched or augmented with contextual attributes, enabling deeper understanding and interpretation. This data includes not only the raw information itself but also metadata, timestamps, relationships, and other contextual cues that provide additional layers of meaning and relevance.

Semantic meaning refers to the interpretation of words, phrases, or sentences based on their contextual understanding and intended significance within a language. It goes beyond literal definitions to capture the deeper, inferred meanings conveyed by language, taking into account factors such as context, tone, and cultural nuances. Metadata is descriptive data that provides information about other data. It helps organize, categorize, and manage information by describing its characteristics, properties, or attributes. Metadata can include details such as creation date, authorship, file format, and keywords, among others, depending on the type of data being described. In the context of an email, metadata includes information about the email itself rather than its content. This typically includes details such as sender and recipient addresses, subject line, date and time sent, attachments, and any routing information (e.g., email servers used). Contextual data facilitates more nuanced analysis, decision-making, and action by capturing the situational context in which the data was generated or is being utilized.

The credential semantic graph includes entities—nodes in the graph represent entities such as concepts, objects, or terms; relationships—edges (connections between nodes) represent relationships or connections between these entities; and semantic meaning—the connections (edges) between nodes carry semantic meaning, indicating how entities are related to each other in a meaningful way beyond simple connectivity. The credential semantic graph 150C includes credential information that is a structured representation that captures relationships and attributes related to credentials in a meaningful and interconnected manner. For example, nodes in the graph represent various components of credential information, such as users, roles, permissions, and access levels; entities between nodes denote relationships or connections between these entities (e.g., an edge might represent a user's association with a specific role or permissions associated with a role.) Nodes and edges may have associated attributes that provide additional details about the entities or relationships. These attributes could include timestamps, validity periods, authentication methods, and authorization rules. The structure and connections in the graph convey semantic meaning about how credentials are structured, assigned, managed, and used within a system or organization.

A notification indicating the identification of a first portion and a second portion of a credential in two pieces of information, such as email attachments, serves to alert users or administrators about the discovery of potentially sensitive information. This notification typically includes details about the first portion of the credential (e.g., username, identifier, or other identifying information associated with the credential pair, which has been identified in the first piece of information (e.g., the first email attachment)); and the second portion of the credential (e.g., This the password, secret, or other confidential data linked with the identified username or identifier, discovered in the second piece of information (e.g., the second email attachment))

Figure 1C:
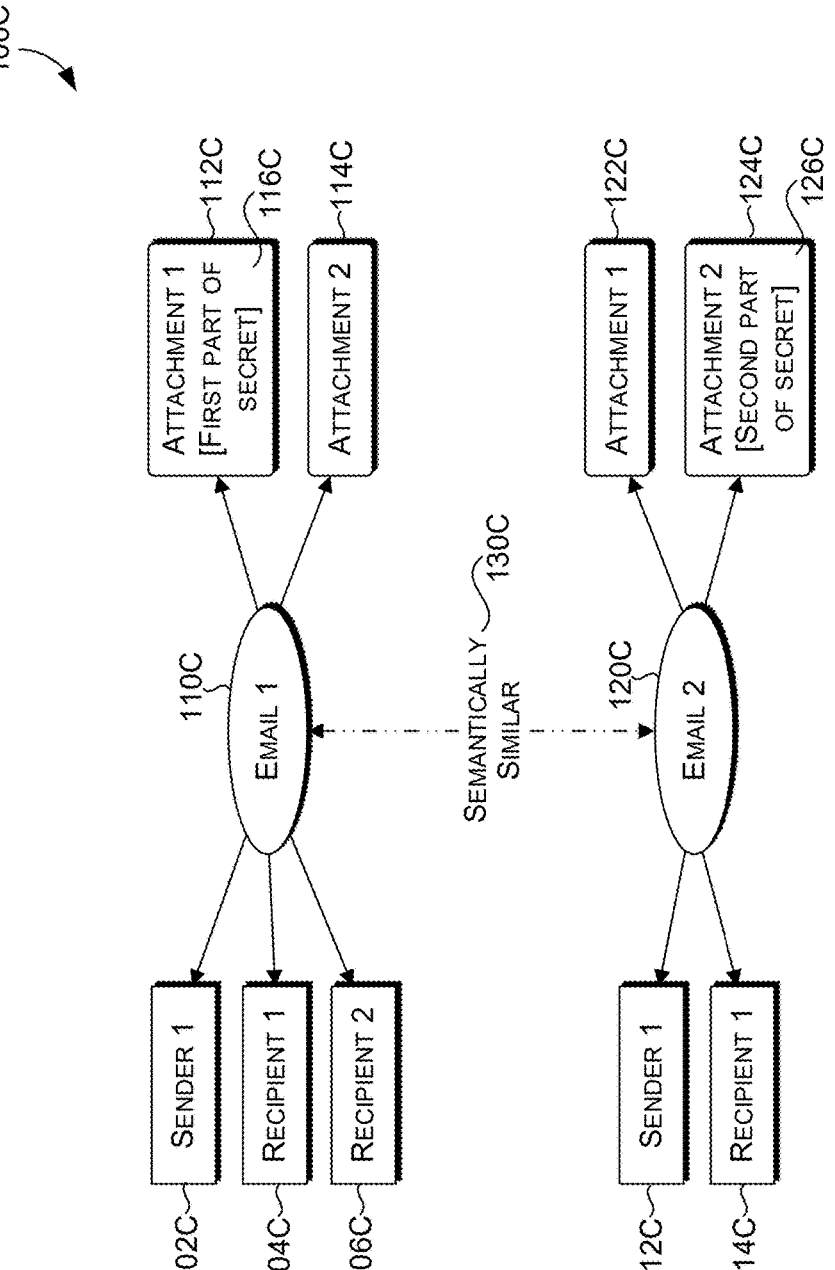

With reference to FIG. 1C, FIG. 1C illustrates a schematic 100C associated with an example credential detection scenario. The credential detection scenario outlines functionality for detecting missing pieces of credentials from separate distinct emails. As shown, sender 1 102C, recipient 1 104C, and recipient 2 106C are associated with email 1 110C that includes attachment 1 112C and attachment 2 114C. Attachment 1 112C includes a first part of a secret 116C. Sender 112C and recipient 114C are associated with email 2 120C that includes attachment 1 122C and attachment 2 126C. The attachment 2 124C includes a second part of a secret 126C. The credential detection engine 140 supports detecting missing pieces of credentials (e.g., first part of a secret 116C that complements the second part of a secret 126C) from separate emails. Portions of a credential (e.g., username and password, secret and account, password and answer to security question) might be split over separate emails. In some situations, where secret information is intentionally shared, this may be by design or created as part of an over-logging or similar issues (e.g., password spit out in one diagnostic log, account name).

By way of illustration, credential detection engine 140 may scan a corpus of emails and identify email 1 110C. A determination is made that email 1 110C includes a first portion of a credential pair (i.e., first part of a secret 116C). Based on determining that the email 1 110C includes the first part of a secret 116C, contextual data can be identified for the email 1 110C. For example, contextual data can include sender 1 102C, recipient 1 104C, and recipient 2 106C and attachment 2 114C.

The contextual data can specifically include a language model generated semantic meaning. For example, a language model can generate the semantic meaning of an email by analyzing the text comprehensively, identifying key entities, relationships, and contextual cues within the message. Using its vast training data and understanding of language patterns, the language model can infer the intent, sentiment, and main topics discussed in the email. It achieves this by processing the text through layers of neural network architectures designed to capture semantic nuances and generate coherent interpretations of the email's content. The contextual data including the semantic meaning enable deeper understanding and interpretation of the first part of the secret 116C. The email 1 110C and the contextual data is used to generate a semantic graph that includes the email 110C and the contextual data.

Similarly, a determination is made that the email 120 include a second portion of a credential pair (i.e., second part of secret 126C). Based on determining that the email 2 120C include the second part of secret 126C, contextual data can be identified for the email 2 120C. For example, contextual data can include sender 1 112C, recipient 1 114C, attachment 1 122C, and attachment 2 124C. The email 2 120C and the contextual data are added to the semantic graph. By walking the semantic graph of emails, the credential detection engine 140 can find collected secrets by matching (i.e., semantically similar 130) them based on contextual data (e.g., similar senders, email metadata), as well as the semantic meaning of the emails. This allows the credential detection engine 140 to capture patterns of connectivity that would otherwise be difficult to detect from a single pass.

Walking through a semantic graph of emails to identify related items based on similarity, such as cosine similarity, can be performed in different ways. In an example implementation, first, each email is represented as a vector in a high-dimensional semantic space, where dimensions correspond to semantic features derived from the text using techniques like word embeddings or contextual embeddings. Next, pairwise similarities between email vectors are calculated using metrics like cosine similarity, which measures the cosine of the angle between vectors and indicates their similarity in meaning. The semantic graph is then traversed to find emails that have high cosine similarity scores, indicating they share similar semantic content. Finally, related items are identified and grouped based on these similarity scores, facilitating tasks such as clustering related emails or recommending similar messages based on content overlap in the semantic space. Credential detection engine 140 leverages the contextual data captured by embeddings to effectively navigate and analyze email relationships beyond traditional keyword-based methods.

Matching first part of a secret 116C and second part of secret 126C via the semantic graph involves traversing nodes and edges to identify entities that share common attributes, relationships, or semantic contexts. By examining the semantic graph's structure and utilizing algorithms such as similarity measures or clustering techniques, related items can be grouped together based on their proximity or similarity within specific subsets of the graph. Credential detection engine 104 supports discovery of related entities that exhibit cohesive patterns of connectivity, enhancing the ability to uncover meaningful associations and insights from complex datasets. In this way, the semantic graphs enables capturing patterns of connectivity that would otherwise be difficult to detect by highlighting relationships between entities based on their contextual meanings and associations rather than just direct links. These semantic graphs uncovers hidden connections and correlations across diverse datasets, revealing intricate relationships that may not be apparent through simple data queries or traditional analysis methods. By integrating semantic understanding into the structure of the graph, complex patterns of connectivity emerge, providing deeper insights and facilitating detection of credential pairs.

Figure 1D:
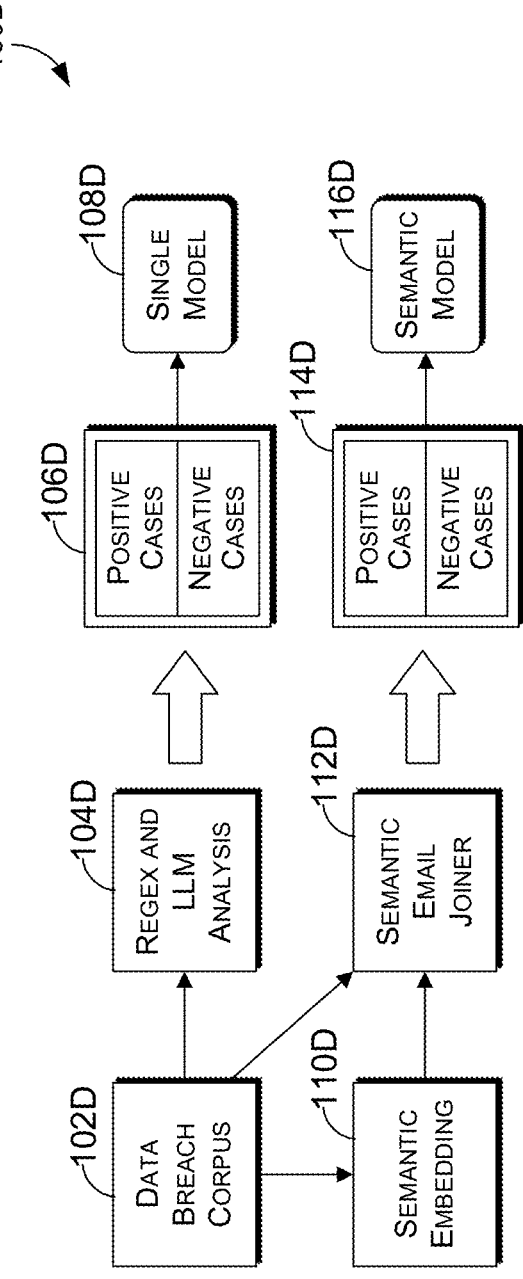

With reference to FIG. 1D, FIG. 1D illustrates a schematic 100D associated with training fast prediction models for predicting secrets. FIG. 1D includes data breach corpus 102D, regex and LLM analysis 104D, positive cases and negative cases 106D, single model 108D, semantic embedding 110D, semantic email joiner 112D, positive cases and negative cases 114D, and semantic model 116D. Two separate models (i.e., single model 108D and semantic model 116D) can be trained. Single model 108D is highly focused on predicting secrets and other sensitive information from data breach documents and semantic model 116D that can be used to bridge and predict data from multiple pieces. The models are trained with detection signals from all sources, where sentences confirmed to match information types of interest (secrets, personal information, etc.) are converted into semantic queries that can match future content. Optionally, the success rate of each generated semantic query is used to continually inform the models and improve detection performance. These two models can then be used in real time to analyze and rapidly scan emails and other sensitive documents for further follow up analysis.

By way of illustration, Regex and LLM analysis 104D involves two distinct approaches to data processing and understanding. Regex is used to search, match, and extract specific patterns (e.g., credential patterns) of text or data (e.g., data breach corpus 102D) based on predefined rules, allowing for precise data manipulation and extraction tasks. LLM analysis, on the other hand, employs a large-scale neural network model to infer semantic meaning, relationships, and patterns within the dataset, enabling more sophisticated tasks such as natural language understanding, summarization, and sentiment analysis. Integrating both regex and LLM techniques can enhance data processing capabilities by combining structured pattern matching with deep semantic understanding.

With regard to positive cases and negative cases 106D, positive cases refer to instances or examples that exhibit the presence of a particular attribute, condition, or outcome of interest (e.g., credential pattern). In contrast, negative cases denote instances or examples where the attribute, condition, or outcome of interest is absent or does not occur as expected. Positive cases and/or negative are processed via the single model 108D to predict secrets and other sensitive information.

Semantic embedding 110D is used to represent data (e.g., data breach corpus 102D) as vectors in a continuous, high-dimensional space. These embeddings are designed to capture semantic relationships between words based on their contextual usage and meaning in a given corpus of text. Semantic email joiner 112 can refer to a semantic joiner of embeddings (e.g., semantic embeddings 110D) to data items in a dataset (e.g., data breach corpus) to bridge the semantic gap between textual representations and structured data instances. By integrating embeddings with data items, applications can leverage the contextual understanding captured in embeddings to enhance tasks such as information retrieval, recommendation systems, and natural language understanding. The semantic email joiner 112D typically involves techniques like indexing, where embeddings are mapped to identifiers or metadata that link back to the original data items. This approach facilitates efficient querying and manipulation of data based on semantic relationships encoded in the embeddings, thereby enabling more sophisticated data-driven decision-making processes.

With regard to positive cases and negative cases 114D in the context of a semantic joiner of embeddings to data items refer to different outcomes that illustrate the joiner's effectiveness or challenges. Positive cases demonstrate instances where the joiner successfully retrieves relevant data items based on semantic similarity, leading to improved search precision or recommendation accuracy. Conversely, negative cases highlight scenarios where the joiner fails to bridge the semantic gap effectively, resulting in retrieval of irrelevant data items or misleading recommendations due to ambiguities or limitations in the embeddings' representation of semantic nuances. Evaluating both positive and negative cases helps refine the joiner's algorithms and parameters to enhance its overall performance and reliability in practical applications. Positive cases and/or negative are processed via the semantic model to bridge and predict data from multiple data items.

Figure 1E:
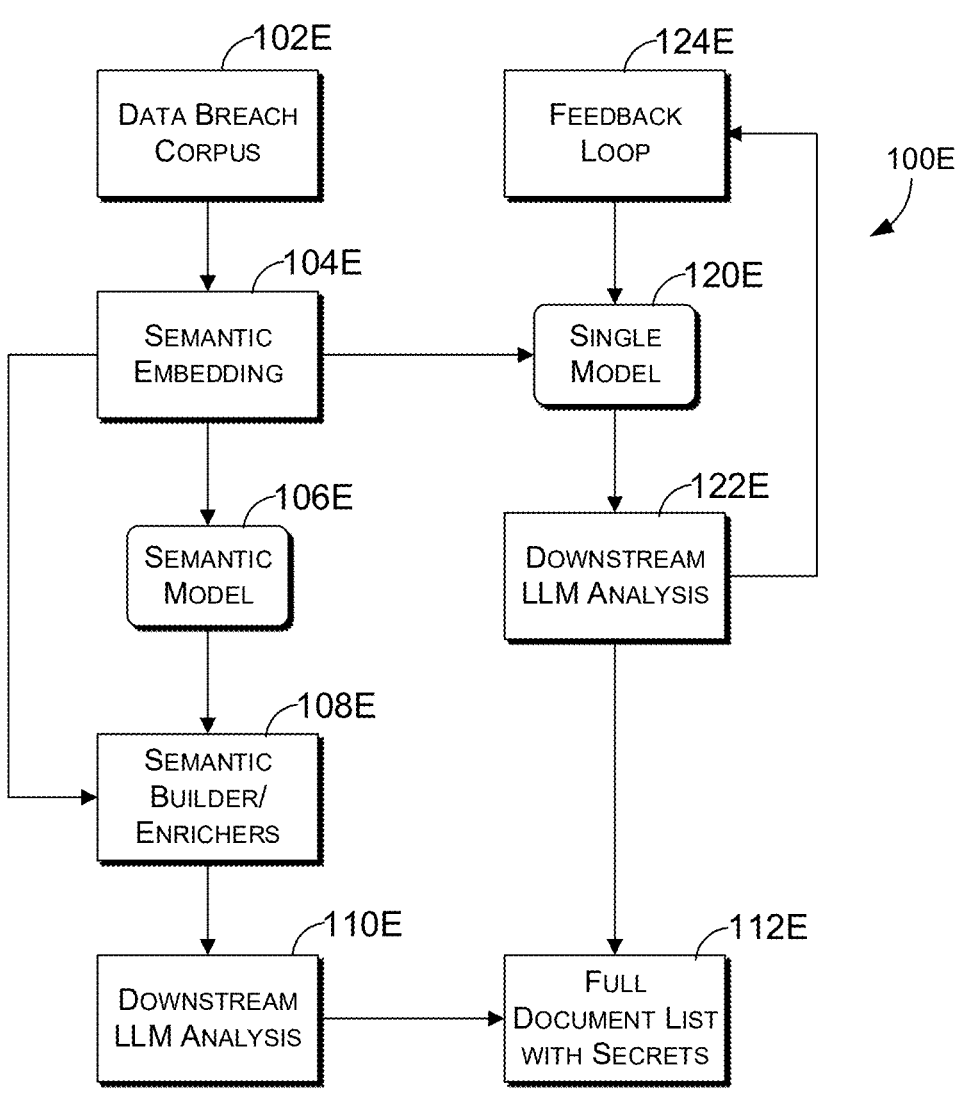

With reference to FIG. 1E, FIG. 1E illustrates a schematic 100E associated with an example implementation of the single model 104B and semantic model 106B. FIG. 1E includes data breach corpus 102E, semantic embedding 104B, semantic model 106B, semantic builder/enrichers 108E, downstream LLM analysis 110E, full document list secrets 112E, single model 120E, downstream LLM analysis 122E and feedback loop 124E. For generating inferences, the two models (i.e., single model 120E and semantic model 106E) can be used to analyze the data (e.g. data breach corpus 102E). Data items (e.g., an email or document) are embedded and a feature vector is created. For a fast single data item list, the data items are passed through the single model 120E, and the data items scoring high are passed for further downstream LLM analysis 122E.

For the semantic model 106E, the semantic model 106E includes two part: first, a first set of data items that include a portion of a secret are identified. After the first set data items are identified in the first part, semantic builder/enrichers 108E perform an enrichment step to build out the predictions of a second set of data items that may include a second portion of the secret.—possibly a second task head from semantic model). The first set of data items and corresponding second set of data items are run through the downstream LLM analysis 110E.

Downstream LLM analysis 110E and downstream LLM analysis can include the application of a pre-trained language model to perform specific, task-oriented analyses or tasks that follow after initial model training. These tasks can include natural language processing (NLP) applications such as text classification, sentiment analysis, named entity recognition, question answering, and summarization. Downstream LLM analysis leverages the capabilities of the LLM to provide insights, make predictions, or generate content relevant to particular use cases. The pre-trained model is fine-tuned on task-specific data to improve its performance on the targeted downstream applications, ensuring the analysis is tailored to the needs of the specific context or domain. For example, the input to the downstream LLM analysis can be potentially security risky data items associate with credentials such as passwords, API keys, and other sensitive information in codebases or documents. The downstream LLM analysis can further process these input to categorize the severity of the findings, suggest remediation steps, and identify patterns or common sources of credential exposure. The output from the downstream LLM analysis 122E and downstream LLM analysis 110E can be combined for full document list of secrets.

Figure 2A:
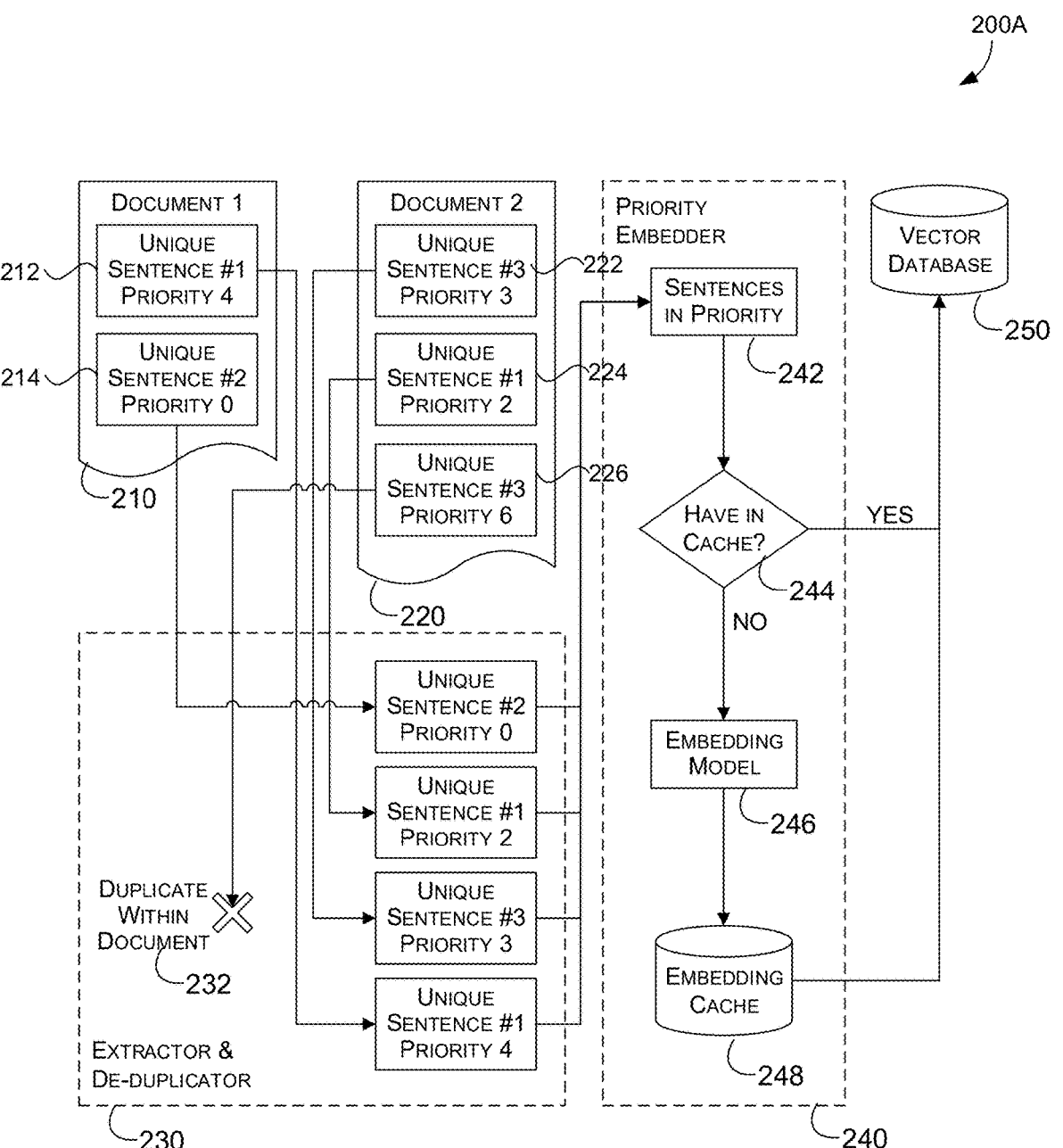
FIGS. 2A-2B are block diagrams associated with an exemplary data intelligence system including a modular cybersecurity engine, in accordance with aspects of the technology described herein.

With reference to FIG. 2A, FIG. 2A illustrates a schematic 200A associated with real-time continuous semantic indexing using modular cybersecurity engine 110. FIG. 2A includes document 210, document 220, extractor and de-duplicator 230, duplication with document 232, priority embedder 240, sentences in priority 242, have in cache 244, embedding model 246, embedding cache 248, vector database 250.

By way of context, semantic indexing is provided via a priority embedder pipeline that refers to structured framework that streamlines the process of prioritizing content instances of data items and embedding content instances for efficient retrieval and analysis. This prioritization ensures that more critical or relevant content receives precedence in the indexing process. The priority embedder pipeline de-duplicates content instances (e.g., sentences) within a data item (e.g., document or email) and across data items based on uniqueness of the content instances and corresponding priority values (e.g., relevance) of content instances, where the priority values are calculated based on contextual data.

Priority embedder pipeline includes priority embedder 240 that refers to an embedder that employs a technique where content (e.g., content instance 212, content instance 214, content instance 222, content instance 224, and content instance 226) of data items (e.g., document 210 and document 220) are prioritized and sharded based on their significance or relevance before embedding. Priority embedding process involves assigning priority values to each content instance (e.g., sentence) according to predefined criteria. Sharding the content instances into subsets for embedding computation in generating embedding vectors. The priority embedder 240 ensures that higher-priority content instances receive embedding priority, enabling faster retrieval and analysis in applications requiring real-time or large-scale semantic processing.

Priority embedder 240 includes an embedding model 246 that is a computational framework that is used to convert textual input into dense, semantically meaningful vectors. An embedding cache 248 is a memory or storage mechanism that temporarily holds computed embedding vectors for efficient retrieval, minimizing redundant calculations. An embedding vector database 250 is a persistent storage system where precomputed embedding vectors are stored for rapid access and retrieval, facilitating quick semantic querying and analysis tasks in applications like information retrieval and recommendation systems.

By way of illustration, for efficient, real-time continuous semantic indexing of content, a priority embedder 240 is associated with a priority embedder pipeline that de-duplicates content is employed. The priority embedder pipeline breaks down documents into individual sentences, assigning each sentence a priority value based on its significance, which is derived from contextual data (e.g., file type, sentence position within the file, and contextual relevance).

During the extraction stage (i.e., extractor de-duplicator 230), the priority embedder pipeline performs de-duplication by identifying and removing redundant sentences (e.g., an identified matching content instance) within a single document (e.g., duplicate within document 232). When the same sentence (e.g., an identified matching content instance) appears across multiple documents, the priority embedder pipeline novel embedder design ensures that the copy with the highest priority value is retained. This prioritization process is driven by sophisticated algorithms that evaluate and compare the significance of sentences, ensuring the most relevant content is indexed. As such, a matching content instance or an identified matching content instance refers to a piece of content (e.g., a sentence) identified as having significant similarity or correspondence with another content instance based on predefined criteria. This matching can occur within a single group of content (e.g., a first set of content instances) or between two distinct groups (e.g., a first set of content instances and a second set of content instances). When comparing content within a single group, such as a set of articles on a specific topic, a matching content instance is one that closely resembles or aligns with other content items in that same set. Conversely, when examining content across two separate groups, a matching content instance is a piece from one group that shows notable similarity or relevance to content in the other group. For instance, a sentence in the first set of content instances might match a second set of content instances.

For example, consider a scenario where multiple technical reports contain the recurring sentence, "Our system achieved 99.9% uptime in the past year." If this sentence appears in an executive summary, a detailed results section, and an appendix, the priority embedder pipeline will evaluate the priority based on factors such as the sentence's presence in the summary (typically higher-priority) versus the appendix (typically lower priority). Consequently, only the highest priority occurrence of the sentence is indexed, reducing redundancy and optimizing storage and retrieval efficiency. In the priority embedder pipeline, the process focuses on generating embedding vectors for a set of unique content instances. This set is comprised of content that has been prioritized as higher-priority due to its greater relevance or importance in the overall context. The prioritization could be based on various factors and specific relevance criteria defined for prioritization.

Within the pipeline, this set of content instances is specifically selected and processed before other sets. The embedding vectors for these high-priority instances are generated with precedence, ensuring that they are represented in the numerical format used for further analysis or machine learning tasks. This prioritization ensures that the most critical content is embedded first, leading to more effective and timely processing of important data. The pipeline's structured approach means that the embedding process is tailored to handle these prioritized instances with an emphasis on their significance, which improves the overall efficiency and relevance of content analysis. By focusing on high-priority content first, the system can better address key needs and provide more pertinent insights or responses based on this important data.

Sentences in priority 242 can be an embedding queue that supports dynamic reordering of content instances in the embedding queue. For example, a first sentence in the sentences in priority 242 can be reordered or removed based on a new sentence that matches the first sentences, where the new sentences has a higher priority values. At have in cache 244 a determination is made whether sentences have already been cached, such that, embedding of a sentence is bypassed if the sentence has already been cached (i.e., embedded). Embedding vectors are generated for the remaining sentences using embedding model 246, the embeddings are cached in embedding cache 248, and stored in the vector database 250. The vector database 250 can operate as a semantic index comprising sentence embeddings. The semantic index refers to a structured database or repository where sentences from documents or textual data are represented as numerical vectors (i.e., embedding vectors) that capture their semantic meanings and contextual relationships. This indexing method facilitates semantic searching by enabling algorithms to retrieve information based on the semantic similarity between queries and indexed sentences, rather than relying solely on exact keyword matches.

Figure 2B:
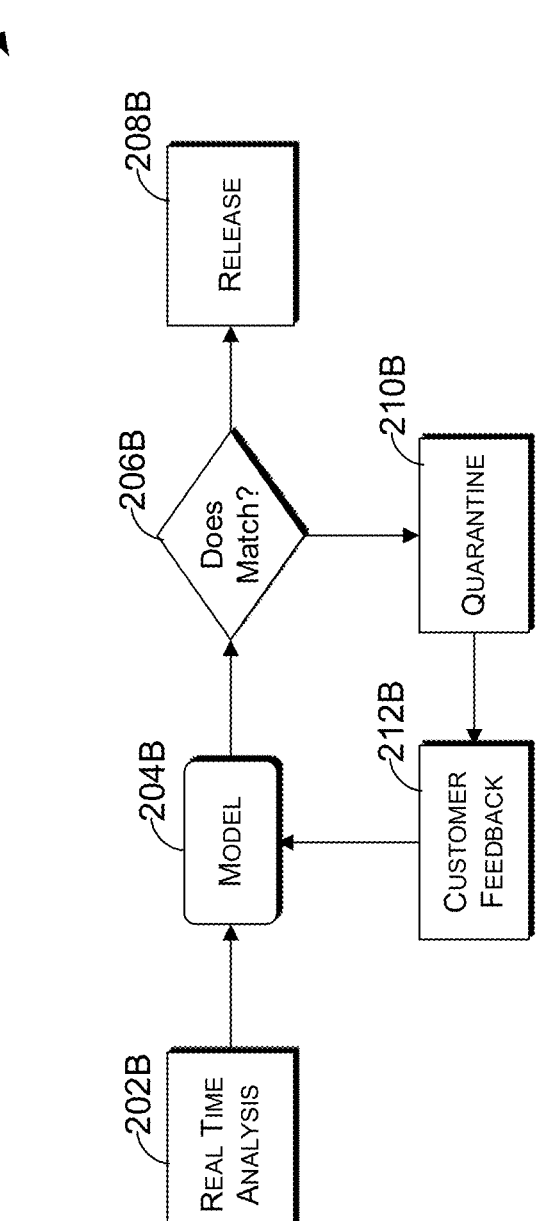

With reference to FIG. 2B, FIG. 2B illustrates a schematic 200B associated with an example real time analysis associated with the modular cybersecurity engine 110. FIG. 2B includes real time analysis 202B, model 204B, match 206B, allow 208B, quarantine 210B, and customer feedback 212B. Modular cybersecurity engine 110 can provide real-time analysis system via an integrated user interface. Real-time analysis 202B can include data items (e.g., emails) that are processed using, and a machine learning model (e.g., model 204B) trained on detecting sensitive information such as passwords, API keys, and other secrets is deployed to provide instantaneous analysis. The modular cybersecurity engine 110 employs Natural Language Processing (NLP) and pattern recognition techniques to automatically determine if a data item matches 206B (i.e., flagged based on predefined security policies and anomaly detection algorithms) in order to block and quarantine data items 210B (i.e., emails or data) or release 208B the data item. For example, if an email contains an unencrypted password or an exposed API key, it is immediately quarantined.

The quarantined data is then forwarded to security investigators and analysts for in-depth examination and verification using advanced forensic tools and techniques. Analysts can further classify the threat, determine its origin, and recommend remediation steps. Additionally, a continuous customer feedback loop 212B is implemented, where user interactions and feedback on false positives and missed detections are collected and used to retrain and update the model. This feedback loop leverages techniques such as active learning and model retraining to enhance the model's (e.g., model 204B) predictive accuracy and responsiveness, ensuring that it adapts to emerging threats and evolving user behaviors.

For instance, the modular cybersecurity engine 110 might initially quarantine emails containing sequences of numbers and letters resembling credit card information. Over time, by analyzing feedback and refining detection algorithms, the model can learn to distinguish between actual credit card numbers and benign numerical sequences, reducing false positives. This iterative improvement cycle ensures that the system remains effective and reliable, offering robust real-time protection and analysis for sensitive information in customer communications.

Aspects of the technical solution have been described by way of examples and with reference to FIGS. 1A-1E, 2A and 2B. FIG. 1A is a block diagram of an exemplary technical solution environment, based on example environments described with reference to FIGS. 6, 7 and 8 for use in implementing embodiments of the technical solution are shown. Generally the technical solution environment includes a technical solution system suitable for providing the example cloud computing system 100 in which methods of the present disclosure may be employed. In particular, FIG. 1A illustrates a high level architecture of the cloud computing system 100 in accordance with implementations of the present disclosure, among other engines, managers, generators, selectors, or components not shown (collectively referred to herein as "components").

Example Methods

Figure 3:
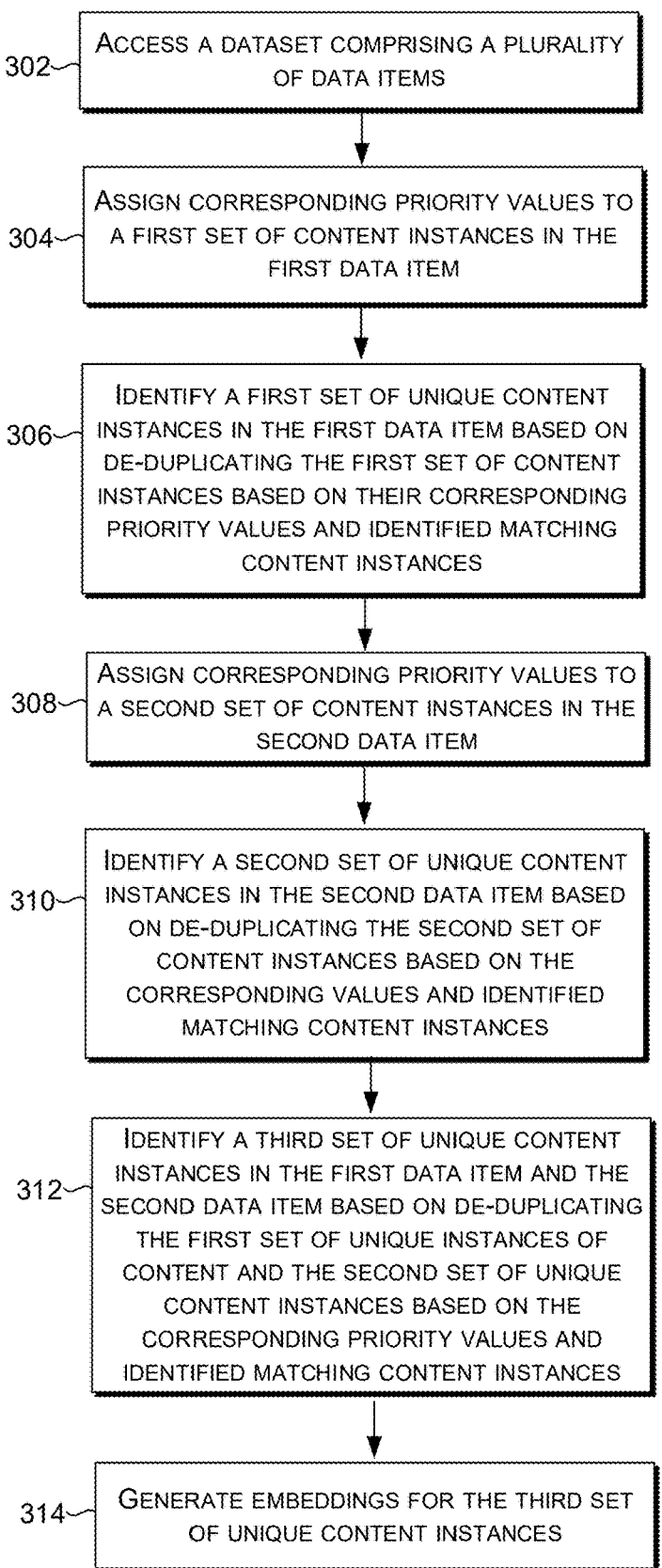
FIG. 3 provides a first exemplary method of providing semantic indexing of content using a modular cybersecurity engine, in accordance with aspects of the technology described herein.
Figure 4:
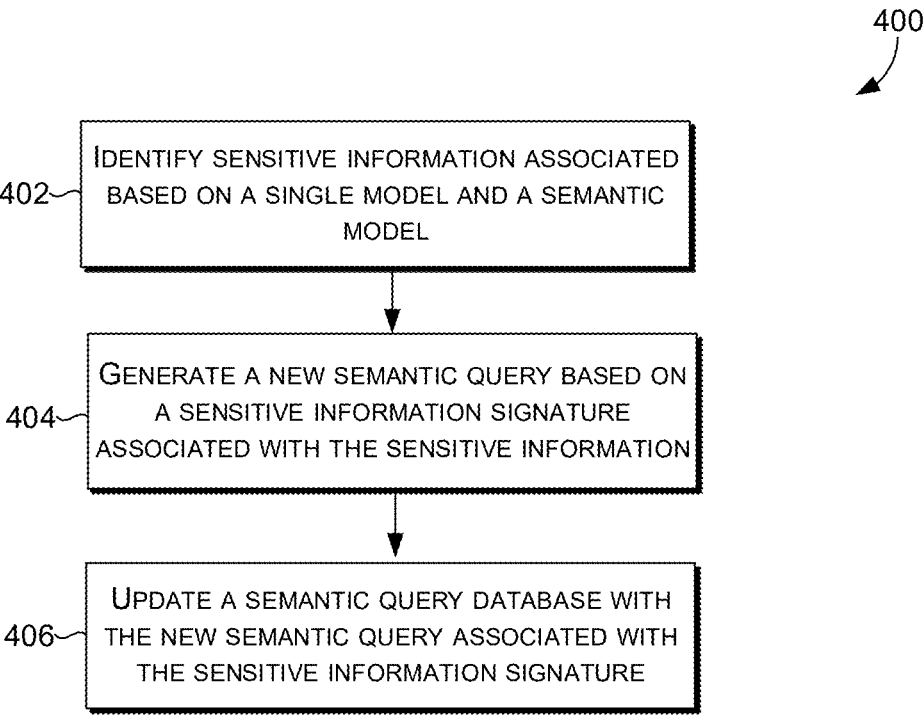
FIG. 4 provides a second exemplary method of providing an updated semantic query using a modular cybersecurity engine, in accordance with aspects of the technology described herein.

With reference to FIGS. 3, 4, and 5, flow diagrams are provided illustrating methods for providing modular cybersecurity platform using a modular cybersecurity engine in a data intelligence system. The methods may be performed using the design system described herein. In embodiments, one or more computer-storage media having computer-executable or computer-useable instructions embodied thereon that, when executed, by one or more processors can cause the one or more processors to perform the methods (e.g., computer-implemented method) in the data intelligence system (e.g., a computerized system).

Turning to FIG. 3, a flow diagram is provided that illustrates a method 300 for providing semantic indexing using a modular cybersecurity engine in a data intelligence system. At block 302, access dataset comprising a plurality of data items. The plurality of data items comprising a first data item and a second data item. At block 304, assign a first set of content instances in the first data item corresponding priority values. At block 306, identify a first set of unique content instances in the first data item based on de-duplicating the first set of content instances based on their corresponding values and content instances in the first set of content instances. At block 308, assign a second set of content instances in a second data item corresponding priority values. At block 310, identify a second set of unique content instances in the second data item based on de-duplicating the second set of content instance based on their corresponding priority values and content instances. At block 312, identify a third set of unique content instances in the first data item and the second data item based on de-duplicating the first set of unique content instances and the second set of unique content instances based on corresponding priority values and matching unique content instances. At block 314, generate embeddings for the third set of unique content instances.

Turning to FIG. 4, a flow diagram is provided that illustrates a method 400 for providing a new semantic query using a modular cybersecurity engine in a data intelligence system. At block 402, identify sensitive information based on a single model and a semantic model. At block 404, generate a new semantic query based on a sensitive information signature associated with the sensitive information. At block 406, update a semantic query database with the new semantic query associated with the sensitive information signature.

Turning to FIG. 5, a flow diagram is provided that illustrates a method 500 for providing credential detection using a modular cybersecurity engine in a data intelligence system. At block 502, scan a dataset comprising a plurality of data items. At block 504, identify a first portion of a credential in a first data item and a second portion of the credential pair in second data item. At block 506, generate a semantic graph comprising the first data item and the second data item. At block 508, determine that the first portion of the credential pair and the second portion of the credential pair match the credential signature based on the credential signature, the first data item semantic meaning, the first data item metadata, the second data item semantic meaning, and the second data item metadata. At block 510, communicate a notification associated with the first data item and the second data item.

Technical Improvement

Embodiments of the present techniques have been described with reference to several inventive features (e.g., operations, systems, engines, and components) associated with a design system. Inventive features described include: operations, interfaces, data structures, and arrangements of computing resources associated with providing the functionality described herein relative with reference to a modular cybersecurity engine. Functionality of the embodiments of the present invention have further been described, by way of an implementation and anecdotal examples—to demonstrate that the operations for providing the modular cybersecurity engine as a solution to a specific problem in data intelligence technology to improve computing operations in data intelligence systems.

Advantageously, the modular cybersecurity engine provides a modular framework that can be tailored to various cybersecurity applications. Modular cybersecurity engine (e.g., modular distributed system) enables users to access a suite of analytical tools that can be configured based on specific requirements, permissions, and security clearances, ensuring comprehensive risk analysis and data protection. Users can access a broad set of tools that can be adapted for different cybersecurity and data management tasks. Modular cybersecurity engine's access control dynamically adjusts to provide the appropriate level of data visibility to each user, securing sensitive information across applications. The modular nature of the system allows it to scale efficiently, handling varying volumes of data without compromising performance or security.

The priority embedder pipeline provides a prioritization algorithm that improves the efficiency or effectiveness of data processing or resource allocation within cybersecurity context, thereby constituting a specific technological advancement. For instance, the prioritization algorithm enhances computing system performance, reduces latency, or optimizes resource management. The prioritization algorithm addresses a specific technical problem in a practical manner in that it supports optimizing task scheduling and resource allocation in a way that significantly enhances system performance. In this way, the priority embedder pipeline provides tangible benefits by incorporating specific techniques for improving data handling, processing speed, or system efficiency, thus demonstrating a practical application that aligns with technological improvement principles.

Moreover, modular cybersecurity engine (e.g., credential detection engine) includes a machine learning-based analysis model that leverages LLMs to scan through large datasets, identifying sensitive data points. Initially fine-tuned for credential scanning, the credential detection engine's architecture allows for the adaptation to other use cases, such as privacy policy compliance. Existing data detection systems rely on rigid rules constructed ahead of time, our system determines and continually self-improves its own semantically flexible detection rules.

The credential detection engine can be tuned to scan for a wide range of sensitive data types, not limited to credentials. The credential detection engine's flexible design allows for future adaptations to new use cases without the need for a complete overhaul. The credential detection engine self-improves by incorporating new data patterns into its reference database, enhancing its predictive accuracy for various applications.

The modular cybersecurity engine (e.g., credential semantic graph engine) employs advanced data analysis techniques, including semantic graph analysis, to detect and link different forms of sensitive information. This capability ensures that the system can manage a wide spectrum of data protection needs.

The credential semantic graph engine's data analysis capabilities extend beyond credential detection to other sensitive data types. The credential semantic graph engine can link related data points across digital content, regardless of the type of sensitive information being analyzed.

The modular system provides the ability to rapidly adapt to new threats and integrate new tools and technologies. Addressing multiple threat vectors and closing potential security gaps. Simplified management and coordination of security tools, leading to quicker and more effective threat response. Moving beyond traditional regex-based methods to more sophisticated detection techniques, such as machine learning and context-aware analysis, to better identify and manage credentials and secrets. By leveraging a modular approach, organizations can enhance their cybersecurity posture, improve response times, and reduce the risk of successful cyber threats.

Additional Support for Detailed Description

Example Data Intelligence System in a Cloud Computing Environment

Figure 6:
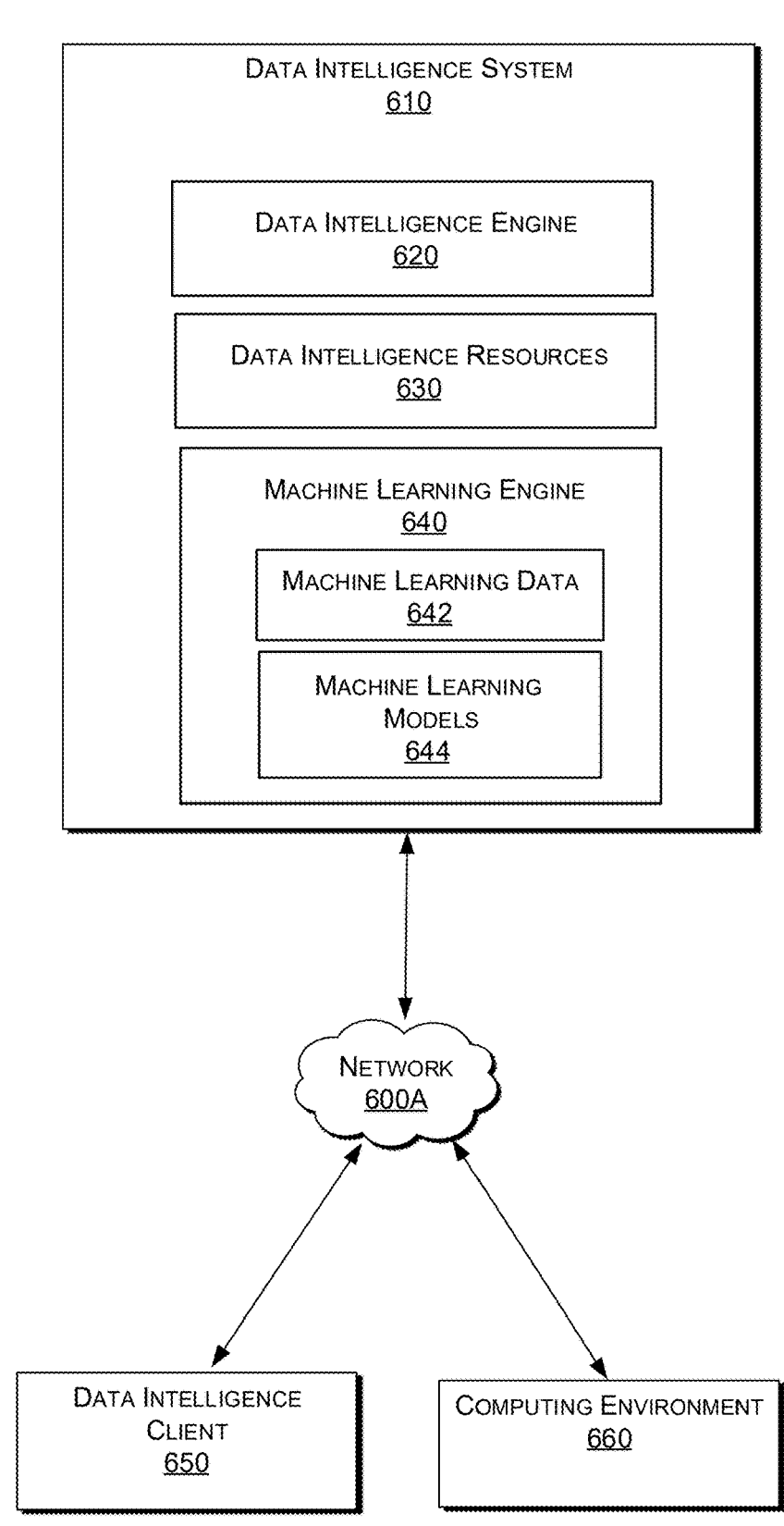
FIG. 6 provides a block diagram of an exemplary data intelligence system suitable for use in implementing aspects of the technology described herein.

Referring now to FIG. 6, FIG. 6 illustrates a computing environment in which implementations of the present disclosure may be employed. In particular, FIG. 6 shows a high level architecture of an example cloud computing platform 600 and data intelligence system 610 that can host a technical solution environment. It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

The cloud computing environment 100 provides computing system resources for different types of managed computing environments. For example, the cloud computing platform supports delivery of computing services—including compute, servers, storage, databases, networking, and intelligence. The components of cloud computing environment 600 may communicate with each other over a network 600A which may include, without limitation, one or more local area networks (LANs) and/or wide area networks (WANs).

The data intelligence system 610 provides data intelligence functionality for computing environments. The data intelligence system 610 is a platform or framework that leverages advanced technologies such as artificial intelligence (AI), machine learning (ML), data mining, and big data analytics to extract actionable insights and knowledge from large and complex datasets. In this way, the data intelligence system 610 provides a computing environment that enables organizations to make informed decisions and optimize operations.

The data intelligence system 610 can be implemented as a security management system that supports planning, implementing, controlling, and monitoring security measures to protect assets, resources, and information from various threats and risks in computing environment. Data intelligence system 610 as a security management system is configured to trigger alerts for potential or actual threats—including suspicious behavior or malicious behavior—in a computing environment. For example, an alert configuration can be defined to include alert settings, which if met, trigger an alert. The security alert can refer to a human-readable, technical notification regarding current vulnerabilities, exploits, and other security issues associated with a computing environment. The alert can be communicated to a client device that is managed by a security administrator who can then follow up on the alert. The security management system can be a security management system described in U.S. patent application Ser. No. 18/451,405, filed Aug. 17, 2023, entitled "ARTIFICIAL INTELLIGENCE ENGINE IN A SECURITY MANAGEMENT SYSTEM," which is incorporated herein by reference in its entirety.

The data intelligence system 610 can further support generating security posture visualizations based on security management engine output. The security posture information can be generated security management engine output such that security posture information is prioritized and filtered. A prioritization identifier (e.g., high, medium, low) can be provided in the security posture visualization in combination with an alert associated with a security incident. Alternatively, a notification associated with the security management information, security prioritization information or the alert can be communicated. Other variations and combinations of communications associated with security management engine output are contemplated with embodiments described herein.

The data intelligence system 610 includes a data intelligence engine 620 that is a computing environment that supports executing computational tasks associated with the data intelligence system 610. The data intelligence engine 620 can be a hardware or software component that performs computational operations, such as, mathematical calculations, data processing, and algorithm execution. The data intelligence system 610 integrates data intelligence resources 630 into data intelligence system 610 to effectively provide data intelligence functionality in a computing environment.

The data intelligence engine 620 may collect, aggregate, and integrate data from diverse sources, including structured and unstructured data, internal and external data sources, streaming data, and historical data repositories. The data intelligence engine 620 may further applying a variety of analytical techniques and algorithms, they automate the process of extracting insights, employing machine learning algorithms, AI techniques, and predictive analytics to discover patterns, classify data, make predictions, and generate recommendations.

The data intelligence engine 620 provides visualization tools and dashboards to enable users to explore data, identify trends, and communicate insights effectively, while robust data governance policies and security measures ensure that data is managed and accessed securely, compliantly, and ethically. The data intelligence system 610 is designed for scalability and performance, in this way the data intelligence system 610 can handle large volumes of data and support high-performance analytics, including real-time and streaming analytics capabilities for faster decision-making and proactive interventions.

The data intelligence resources 630 refer to computing elements (e.g., components, capability, or entities) that collectively enable the data intelligence engine 620 operations. The data intelligence resources 630 encompass a spectrum of computing elements, beginning with the diverse operations the data intelligence resources 630 can perform, ranging from complex computations to data manipulations. Interfaces, an integral part of the data intelligence resources 630, provide the means for both user interaction and seamless integration with external systems, ensuring a dynamic and interactive computing experience. The data facet of the data intelligence resources 630 involves various types: input data, which is the information provided for processing; processing data, representing the data manipulated during computational tasks; and output data, the results generated by the data intelligence engine 620. In this way, the data intelligence resources 630 support the broader data intelligence engine 620 and data intelligence system 610.

Data intelligence resources 630 include operations, interfaces, and data that support providing data intelligence functionality—operations encompass the tasks performed on the data, interfaces facilitate interaction with the data intelligence system 610, and data serves as the input and output of the system's operations, forming the core components of a data intelligence system. In particular, iterations in a data intelligence system 610 encompass tasks such as data acquisition, preprocessing, analysis, model training, inference, visualization, and reporting. Operations involve manipulating data to extract insights and intelligence. For instance, preprocessing may involve cleaning and transforming data, while analysis could include descriptive statistics or predictive modeling. Interfaces serve as points of interaction between users, applications, and the system, facilitating access to functionality and consumption of outputs. Examples include graphical user interfaces (GUIs), command-line interfaces (CLIs), and application programming interfaces (APIs), and data visualization tools, which allow users to interact with and visualize results. Data, comprising raw and processed information, serves as the input and output of system operations. Data may originate from various sources, structured or unstructured, and undergo preprocessing before analysis. Examples include customer data, financial data, and sensor data stored in formats like databases or data lakes.

Machine learning engine 640 is a machine learning framework or library that operates as a tool for providing infrastructure, algorithms, capabilities for designing, training, and deploying machine learning models. The machine learning engine 640 can include pre-built functions and APIs that enable building and applying machine learning techniques. The machine learning engine 140 can provide a machine learning workflow from data processing and feature extraction to model training, evaluation, and deployment.

Machine learning data 642 refers to the structured or unstructured information used to train, validate, and test machine learning models. This machine learning data 642 typically comprises input features (also known as independent variables or predictors) and their corresponding target values (also known as dependent variables or labels). Machine learning data 642 can come from various sources, such as databases, sensor readings, text documents, images, audio recordings, or streaming data sources. Machine learning data 642 may require preprocessing, cleaning, and transformation to ensure its suitability for training machine learning models. Additionally, machine learning data 642 is often divided into training, validation, and testing sets to assess the performance and generalization ability of trained models accurately.

Machine learning models 644 are algorithms or mathematical representations that learn patterns and relationships from the provided data to make predictions or decisions without being explicitly programmed. Machine learning models 644 models are trained using the machine learning data 642, where they iteratively adjust their internal parameters or coefficients to minimize prediction errors or maximize performance metrics. Machine learning models 644 can be classified into various types based on their learning algorithms and the nature of the problem they address, including supervised learning models (e.g., regression, classification), unsupervised learning models (e.g., clustering, dimensionality reduction), and reinforcement learning models. Once trained, machine learning models 644 can be deployed in production environments to make predictions on new, unseen data instances. Regular evaluation and monitoring of model performance are essential to ensure their accuracy, reliability, and effectiveness in real-world applications.

The data intelligence client 650 supports access to data intelligence system 610 660. The data intelligence client 650 can be provided as a user client or an administrator client to support user and administrator functionality associated with the computing environment 660, data intelligence engine 620, or data intelligence system 610. The data intelligence client 650 can also support accessing data intelligence visualizations and causing display of the data intelligence visualization. The data intelligence client 650 can include a data intelligence engine client that supports receiving data intelligence information associated data intelligence engine 620 output from the data intelligence system 610 and causing presentation of the data intelligence information. The data intelligence information can specifically include data intelligence visualizations associated with the data intelligence engine 620 output.

Data intelligence client 650 provides a graphical or command-line interface for users or administrators to interact with data intelligence system 610. The data intelligence client 650 serves as the interface between users or systems and the underlying data intelligence system, facilitating interactions, querying data, retrieving results, and visualizing insights derived from analyzed data. Users can configure and customize system behavior, adjust parameters, and define workflows through the client interface, tailoring the system to specific use cases or requirements. Interactive visualization tools, including charts, graphs, maps, and dashboards, enable users to explore and interpret data intuitively. Some clients offer built-in tools for data analysis, statistical modeling, and machine learning, allowing users to uncover patterns and trends within the data. Collaboration features support sharing insights, collaborating on analyses, and communicating findings with colleagues or stakeholders. Security measures such as user authentication, access control, encryption, and audit logging ensure data protection and compliance with security policies and regulations.

The data intelligence client 650 can further support executing a remediation action. In particular, the security posture visualization can include a remediation action for an alert associated with data intelligence engine 620 output. The data intelligence client 650 can receive an indication to perform the remediation action associated with data intelligence engine 620 output. Based on receiving the indication to execute the remediation action, the data intelligence client 650 can communicate the indication to execute the remediation action to cause execution of the remediation action.

Computing environment 660 is a computing environment that is integrated into the data intelligence system 610. The computing environment 660 is characterized by an infrastructure, where data from various sources within the ecosystem, including servers, networks, applications, sensors, and user interactions, can be aggregated and processed by the data intelligence system 610 to derive actionable insights. The computing environment 660 can be associated with middleware and integration layers facilitate seamless data flow, while computing infrastructure, encompassing cloud-based resources, distributed computing frameworks, and optimized storage systems, supports functionality associated with the data intelligence.

Example Distributed Computing System Environment

Figure 7:
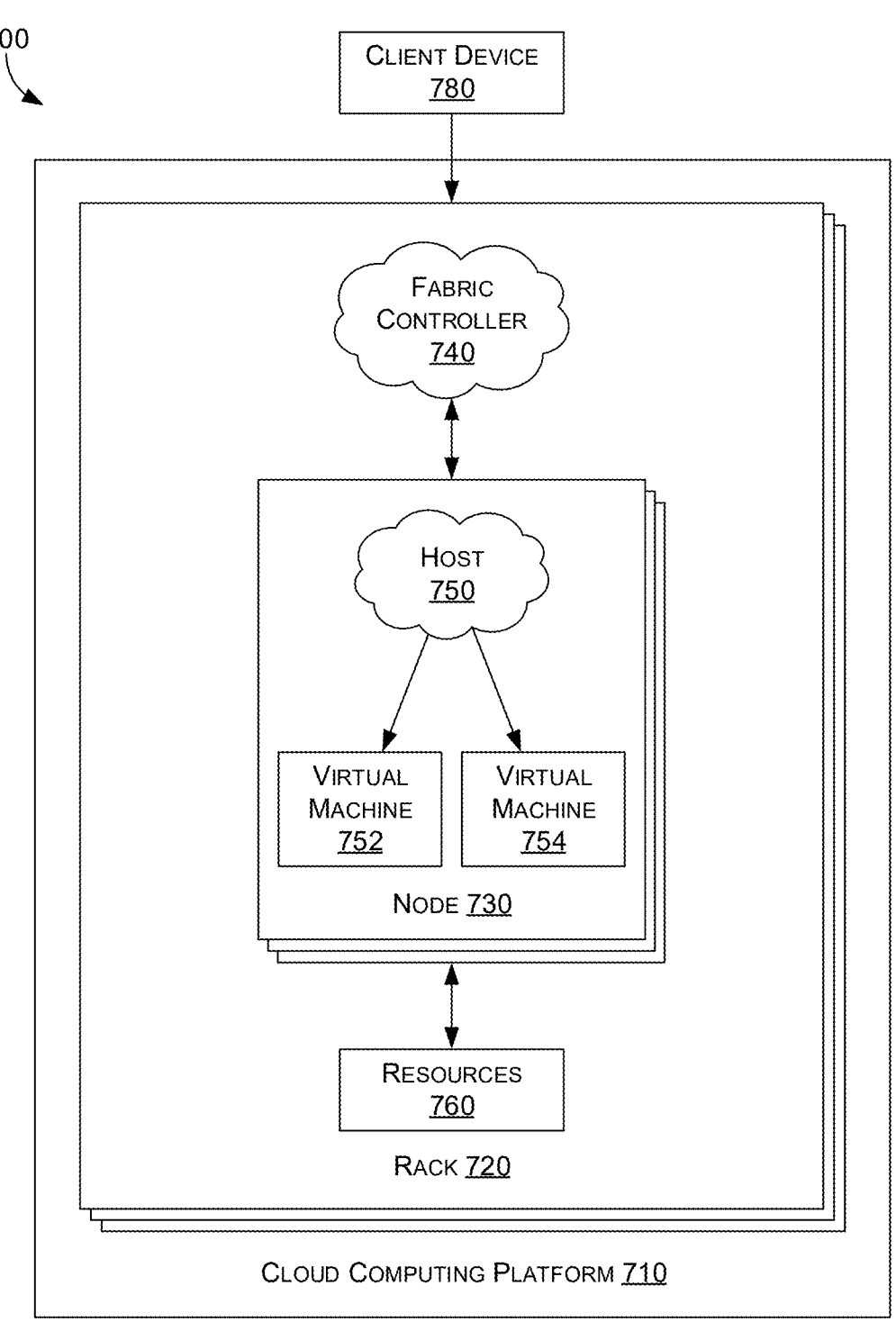
FIG. 7 provides a block diagram of an exemplary distributed computing environment suitable for use in implementing aspects of the technology described herein.

Referring now to FIG. 7, FIG. 7 illustrates an example distributed computing environment 700 in which implementations of the present disclosure may be employed. In particular, FIG. 7 shows a high level architecture of an example cloud computing platform 710 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 700 that includes cloud computing platform 710, rack 720, and node 730 (e.g., computing devices, processing units, or blades) in rack 720. The technical solution environment can be implemented with cloud computing platform 710 that runs cloud services across different data centers and geographic regions. Cloud computing platform 710 can implement fabric controller 740 component for provisioning and managing resource allocation, deployment, upgrade, and management of cloud services. Typically, cloud computing platform 710 acts to store data or run service applications in a distributed manner. Cloud computing infrastructure 710 in a data center can be configured to host and support operation of endpoints of a particular service application. Cloud computing infrastructure 710 may be a public cloud, a private cloud, or a dedicated cloud.

Node 730 can be provisioned with host 750 (e.g., operating system or runtime environment) running a defined software stack on node 730. Node 730 can also be configured to perform specialized functionality (e.g., compute nodes or storage nodes) within cloud computing platform 710. Node 730 is allocated to run one or more portions of a service application of a tenant. A tenant can refer to a customer utilizing resources of cloud computing platform 710. Service application components of cloud computing platform 710 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 730, nodes 730 may be partitioned into virtual machines (e.g., virtual machine 752 and virtual machine 754). Physical machines can also concurrently run separate service applications. The virtual machines or physical machines can be configured as individualized computing environments that are supported by resources 760 (e.g., hardware resources and software resources) in cloud computing platform 710. It is contemplated that resources can be configured for specific service applications. Further, each service application may be divided into functional portions such that each functional portion is able to run on a separate virtual machine. In cloud computing platform 710, multiple servers may be used to run service applications and perform data storage operations in a cluster. In particular, the servers may perform data operations independently but exposed as a single device referred to as a cluster. Each server in the cluster can be implemented as a node.

Client device 780 may be linked to a service application in cloud computing platform 710. Client device 780 may be any type of computing device, which may correspond to computing device 700 described with reference to FIG. 7, for example, client device 780 can be configured to issue commands to cloud computing platform 710. In embodiments, client device 780 may communicate with service applications through a virtual Internet Protocol (IP) and load balancer or other means that direct communication requests to designated endpoints in cloud computing platform 710. The components of cloud computing platform 710 may communicate with each other over a network (not shown), which may include, without limitation, one or more local area networks (LANs) and/or wide area networks (WANs).

Example Computing Environment

Figure 8:
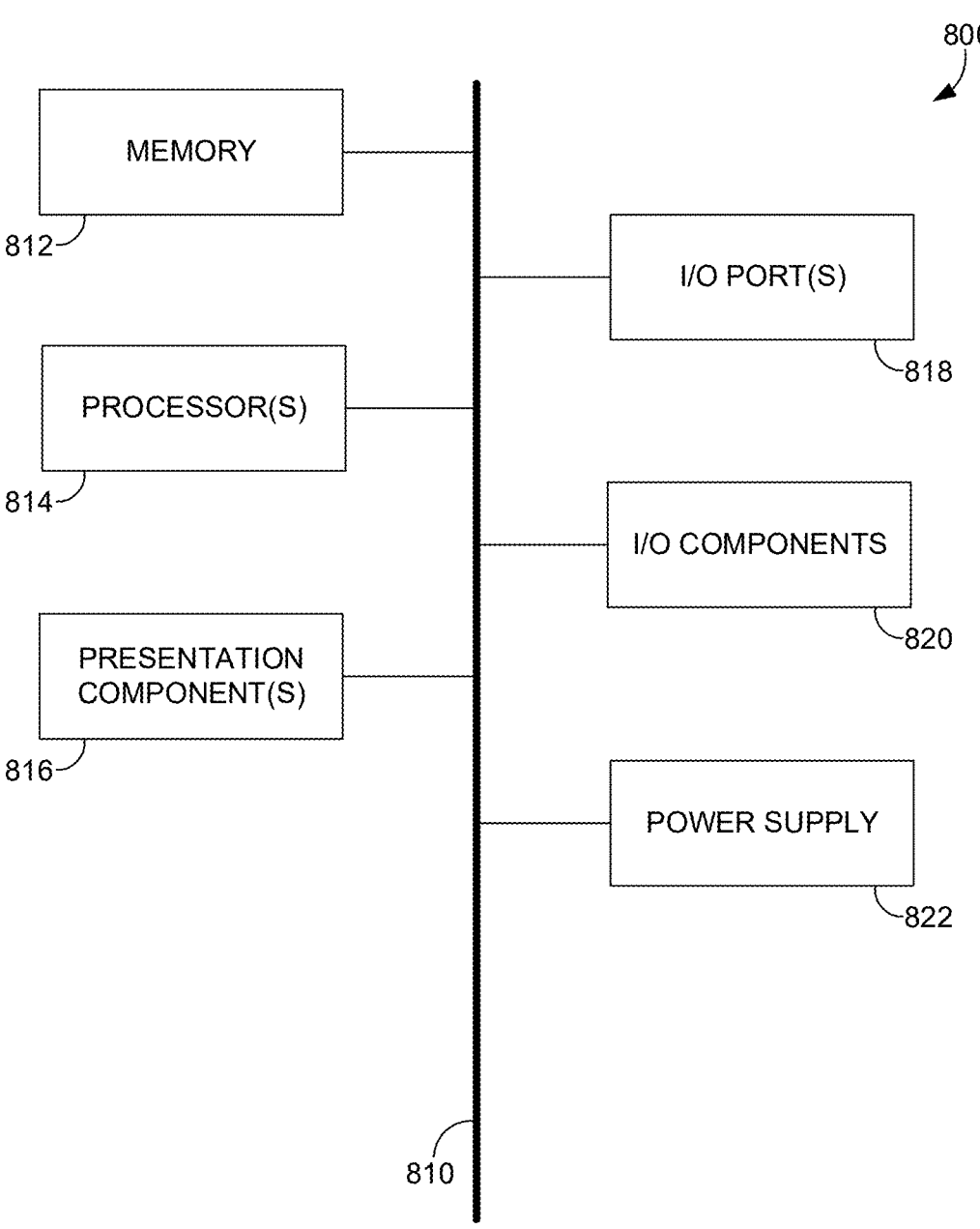
FIG. 8 is a block diagram of an exemplary computing environment suitable for use in implementing aspects of the technology described herein.

Having briefly described an overview of embodiments of the present technical solution, an example operating environment in which embodiments of the present technical solution may be implemented is described below in order to provide a general context for various aspects of the present technical solution. Referring initially to FIG. 8 in particular, an example operating environment for implementing embodiments of the present technical solution is shown and designated generally as computing device 800. Computing device 800 is but one example of a suitable computing environment and is not intended to suggest any limitation as to the scope of use or functionality of the technical solution.

Neither should computing device 800 be interpreted as having any dependency or requirement relating to any one or combination of components illustrated.

The technical solution may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technical solution may be practiced in a variety of system configurations, including hand-held devices, consumer electronics, general-purpose computers, more specialty computing devices, etc. The technical solution may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output ports 818, input/output components 820, and illustrative power supply 822. Bus 810 represents what may be one or more buses (such as an address bus, data bus, or combination thereof). The various blocks of FIG. 8 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 8 is merely illustrative of an example computing device that can be used in connection with one or more embodiments of the present technical solution. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Additional Structural and Functional Features

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technical solution is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technical solution are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present technical solution may generally refer to the technical solution environment and the schematics described herein, it is understood that the techniques described may be extended to other implementation contexts.

For purposes of this disclosure the word "support" refers to provisioning of functionality, services, or assistance by a computing component or through computing operations within a broader computing system. When a computing component or set of operations supports a specific functionality, it means that it plays a role in enabling or executing that particular aspect of the computing system. This support can manifest in various ways, including the processing of data, execution of operations, management of resources, and ensuring compatibility or interoperability with other components. Additionally, support may involve providing interfaces, APIs (Application Programming Interfaces), or protocols that allow seamless interaction and integration with other elements of the computing system. The concept of support extends beyond mere functionality provision to encompass maintenance, troubleshooting, and the overall optimization of computing resources to ensure the robust and efficient operation of the computing system.

Embodiments of the present technical solution have been described in relation to particular embodiments which are intended in all respects to be illustrative rather than restrictive. Alternative embodiments will become apparent to those of ordinary skill in the art to which the present technical solution pertains without departing from its scope.

From the foregoing, it will be seen that this technical solution is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
   one or more computer processors; and
   computer memory storing computer-useable instructions that, when used by the one or more computer processors, cause the one or more computer processors to perform operations, the operations comprising:

accessing, at a priority embedder pipeline, a dataset comprising a plurality of data items, the plurality of data items comprising a first data item and a second data item;

assigning corresponding priority values to a first set of content instances in the first data item;

identifying a first set of unique content instances in the first data item based on de-duplicating the first set of content instances based on the corresponding priority values and identified matching content instances in the first set of content instances;

assigning corresponding priority values to a second set of content instances in the second data item;

identifying a second set of unique content instances in the second data item based on de-duplicating the second set of content instances based on the corresponding priority values and identified matching content instances in the second set of content instances;

identifying a third set of unique content instances in the first data item and the second data item based on de-duplicating the first set of unique content instances and the second set of unique content instances based on the corresponding priority values and identified matching content instances in the first set of unique content instances and the second set of unique content instances; and generating embedding vectors for the third set of unique content instances, wherein the third set of unique content instances are higher-priority content instances identified for vector embedding priority in the priority embedder pipeline.

2. The system of claim 1, wherein assigning a priority value to a content instance is based on contextual data associated with a data item and a content instance, wherein contextual data comprises an attribute of the data item or content instance that is used in calculate the priority value.

3. The system of claim 1, wherein the third set of unique content instances are stored in an embedding queue that supports dynamic reordering of content instances in the embedding queue, wherein a first unique content instance in the third set of unique content instances is reordered based on a new unique content instance that is added to the embedded queue, and wherein the new unique content instance is associated with a higher priority value and matches the first unique content instance.

4. The system of claim 1, the operations further comprising:

bypassing generating an embedding vector for a first unique content instance in the third set of unique content instances based on determining an embedding vector of the first unique content instance already exists; and generating a semantic index based on the a plurality of embedding vectors associated with the dataset, wherein the plurality of data items are documents and a content instance is a sentence, wherein an embedding vector represents the content instance associated with contextual data in a fixed dimensional space for computation analysis.

5. The system of claim 1, wherein the priority embedder pipeline de-duplicates content instances within a data item and across data items based on uniqueness of the content instances and corresponding priority values of the content instances, wherein the priority values are calculated based on contextual data.

6. The system of claim 1, wherein the dataset is associated with a modular distributed engine that supports interoperability between different cybersecurity tools and provides a centralized hub and cybersecurity workflows for programmatic interactions with the modular distributed engine.

7. The system of claim 6, wherein the modular distributed engine further comprises a permissions engine that manages and enforces access rights and permissions; and an audit trail engine that tracks and audits user actions.

8. The system of claim 6, wherein the modular distributed engine further comprises a priority embedder that supports prioritizing content instances of data items and generating embedding vectors for content instances.

9. The system of claim 1, the operations further comprising generating a semantic index comprising the embedding vectors, wherein the semantic index supports executing semantic searches using the embedding vectors.

10. The system of claim 1, wherein the embedding vectors are sentence embeddings comprising numerical representations of sentences extracted from a breached dataset to support detection of sensitive information.

\* \* \* \* \*